(12) United States Patent
Vasyltsov et al.

(10) Patent No.: US 8,886,692 B2
(45) Date of Patent: Nov. 11, 2014

(54) APPARATUS FOR GENERATING RANDOM NUMBER

(75) Inventors: Ihor Vasyltsov, Suwon-si (KR); Karpinskyy Bohdan, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 626 days.

(21) Appl. No.: 13/211,648

(22) Filed: Aug. 17, 2011

(65) Prior Publication Data

US 2011/0302232 A1 Dec. 8, 2011

Related U.S. Application Data

(63) Continuation-in-part of application No. 12/462,825, filed on Aug. 10, 2009, now Pat. No. 8,443,022.

(30) Foreign Application Priority Data

Feb. 9, 2009 (KR) .................. 10-2009-0010201
Mar. 7, 2011 (KR) .................. 10-2011-0019888

(51) Int. Cl.
  *G06F 7/58* (2006.01)
  *H03K 3/84* (2006.01)
  *H04L 9/08* (2006.01)

(52) U.S. Cl.
  CPC *H03K 3/84* (2013.01); *G06F 7/588* (2013.01); *H04L 9/0866* (2013.01)
  USPC .................................. 708/251; 708/255

(58) Field of Classification Search
  CPC .................................. G06F 7/58; G06F 7/588
  USPC .................................. 708/250, 251, 255

See application file for complete search history.

(56) References Cited

U.S. PATENT DOCUMENTS

| 7,315,874 | B2* | 1/2008 | Hars .......................... 708/251 |
| 7,424,500 | B2 | 9/2008 | Fukushima et al. |
| 2004/0017235 | A1* | 1/2004 | Hars .......................... 327/164 |
| 2004/0264233 | A1 | 12/2004 | Fukushima et al. |
| 2007/0273408 | A1 | 11/2007 | Golic |
| 2008/0091755 | A1 | 4/2008 | Mudge et al. |
| 2008/0309533 | A1 | 12/2008 | Baker |

(Continued)

FOREIGN PATENT DOCUMENTS

| JP | 2005-18251 | 1/2005 |
| KR | 10-2006-0125855 | 12/2006 |
| KR | 10-2009-0040136 | 10/2007 |

OTHER PUBLICATIONS

Vasyltsov, Ihor, et al., "Fast Digital TRNG Based on Metastable Ring Oscillator", Cryptographic Hardware and Embedded Systems CHES 2008: Proceedings of the 10th International Workshop, Washington, D.C., USA, Aug. 10-13, 2008, LNCS 5154, International Association for Cryptologic Research, 2008, 164-180.

(Continued)

*Primary Examiner* — Chuong D Ngo
(74) *Attorney, Agent, or Firm* — Onello & Mello, LLP

(57) ABSTRACT

An apparatus for generating a random number has high entropy. The apparatus includes a plurality of random number generators, each of which generates a metastability signal and generates a random number by using the generated metastability signal in a first mode, and in a second mode, the plurality of random number generators are connected to one another to operate as a ring oscillator.

12 Claims, 18 Drawing Sheets

(56) References Cited

U.S. PATENT DOCUMENTS

| | | |
|---|---|---|
| 2008/0313249 A1 | 12/2008 | Fukushima et al. |
| 2009/0106339 A1 | 4/2009 | Vasyltsov et al. |
| 2009/0327381 A1 | 12/2009 | Morad |
| 2011/0163818 A1* | 7/2011 | Dichtl et al. .................... 331/57 |
| 2012/0233233 A1* | 9/2012 | Chandra ....................... 708/251 |

OTHER PUBLICATIONS

"Apparatus and Method for Generating Random Number" Specification, Drawings and Prosecution History, of U.S. Appl. No. 12/462,825, filed Apr. 10, 2009, by Ihor Vasyltsov, et al.

\* cited by examiner

APPARATUS FOR GENERATING RANDOM NUMBER

CROSS-REFERENCE TO RELATED APPLICATIONS

This U.S. non-provisional application claims the benefit of Korean Patent Application No. 10-2011-0019888, filed on Mar. 7, 2011, in the Korean Intellectual Property Office, and is a continuation-in-part of U.S. patent application Ser. No. 12/462,825 filed Aug. 10, 2009, which claims priority under 35 U.S.C. §119 of Korean Patent Application No. 10-2009-0010201, filed on Feb. 9, 2009, the entire contents of which are hereby incorporated by reference.

BACKGROUND

The inventive concept relates to an apparatus for generating a random number, and more particularly, to an apparatus for generating a random number by which a metastability signal is generated using logic gates.

Metastability is widely used in a true random number generator (TRNG) since it is known to have good stochastic properties. Conventionally, to use metastability, a latch or a flip-flop has been mainly used. However, due to various factors such as mismatch between transistors, ionizing radiation, or parasitic fluctuation of output voltages, the probability that a physical flip-flop circuit will stay in a metastable region is very low. The natural metastability rarely occurs and thus it is inefficient to use the metastable phenomenon of the flip-flop circuit. That is, the natural occurrence of metastability is very rare, thus causing a reduction in the value of either accumulated entropy or TRNG throughput.

SUMMARY

The inventive concept provides an apparatus for generating a random number having high entropy.

According to an aspect of the inventive concept, there is provided an apparatus for generating a random number. The apparatus includes a plurality of random number generators, in which each of the plurality of random number generators generates a metastability signal and generates a random number by using the generated metastability signal in a first mode, and the plurality of random number generators are connected to each other to operate as a ring oscillator in a second mode.

In an exemplary embodiment, each of the plurality of random number generators may include a metastability generation unit generating and outputting the metastability signal and an amplifier amplifying an output signal of the metastability generation unit.

In another exemplary embodiment, the metastability generation unit may generate and output the metastability signal in the first mode, and receive and amplify an output signal of a different random number generator in the second mode.

In another exemplary embodiment, the metastability generation unit may include an inverter which inverts and outputs a received signal. An input terminal of the inverter may be connected with an output terminal of the inverter in the first mode, and the input terminal of the inverter may be connected with a different random number generator in the second mode.

In another exemplary embodiment, the metastability generation unit may further include a multiplexer which selectively outputs an input signal in response to a mode signal. A first input terminal of the multiplexer may be connected with an output terminal of the metastability generation unit, and a second input terminal of the multiplexer may be connected with a different random number generator.

In another exemplary embodiment, the second input terminal of the multiplexer may be connected with an output terminal of a metastability generation unit of the different random number generator.

In another exemplary embodiment, the second input terminal of the multiplexer may be connected with an output terminal of an amplifier of the different random number generator.

In another exemplary embodiment, the amplifier may include a plurality of amplification stages amplifying and outputting an input signal, and the plurality of amplification stages may be connected in series.

In another exemplary embodiment, the second input terminal of the multiplexer may be connected with an output terminal of one of the plurality of amplification stages.

In one exemplary embodiment, the apparatus may further include a sampling unit receiving an amplified signal from the amplifier of each of the plurality of random number generators and sampling and outputting the amplified signal according to a sampling clock.

In another exemplary embodiment, the sampling unit may include an XOR gate performing an XOR operation on the amplified signal and outputting an XOR result and a flip-flop sampling and outputting an output signal of the XOR gate.

In another exemplary embodiment, the sampling unit may include a plurality of counters. Each of the plurality of counters counts the number of rising edges, the number of falling edges, or the number of rising and falling edges of the amplified signal of each of the plurality of random number generators.

In another exemplary embodiment, the sampling unit may include an XOR gate performing an XOR operation on output signals of the plurality of counters and outputting an XOR result and a flip-flop sampling and outputting an output signal of the XOR gate.

According to another aspect of the inventive concept, there is provided an apparatus for generating a random number. The apparatus may include a first random number generator which includes a first metastability generation unit generating and outputting a first metastability signal and a first amplifier amplifying an output signal of the first metastability generation unit. The apparatus further may includes a second random number generator which includes a second metastability generation unit generating and outputting a second metastability signal in a first mode and a second amplifier amplifying an output signal of the second metastability generation unit. The second metastability generation unit amplifies the output signal of the first metastability generation unit or an output signal of the first amplifier in a second mode.

In one exemplary embodiment, the second metastability generation unit may include a multiplexer which receives a mode signal and selectively outputs an input signal in response to the mode signal. A first input terminal of the multiplexer may be connected with an output terminal of the second metastability generation unit, and a second input terminal of the multiplexer may be connected with an output terminal of the first metastability generation unit or an output terminal of the first amplifier.

According to another aspect of the inventive concept, an apparatus for generating a random number includes a first random number generator generating a first metastability signal, and a second random number generator generating a second metastability signal. In a first mode, the first random number generator generates a random number by using the first metastability signal and the second random number generator generates a random number by using the second metastability signal. In a second mode, the first random number generator and the second random number generator are connected to each other such that the second random number generator generates an oscillation signal based on an output of the first random number generator.

In one exemplary embodiment, the first random generator includes a first metastability generation unit which generates and outputs the first metastability signal and a first amplifier which amplifies an output signal of the first metastability generation unit.

In another exemplary embodiment, the second random generator includes a second metastability generation unit which generates and outputs the second metastability signal and a second amplifier which amplifies an output signal of the second metastability generation unit.

In another exemplary embodiment, in the second mode, the second metastability generation unit amplifies the first metastability signal or an output signal of the first amplifier.

In one exemplary embodiment, a sampling unit receives an output signal from each of the first random number generator and the second random number generator and samples the output signals according to a sampling clock.

BRIEF DESCRIPTION OF THE DRAWINGS

The foregoing and other features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE EMBODIMENTS

Figure 1:
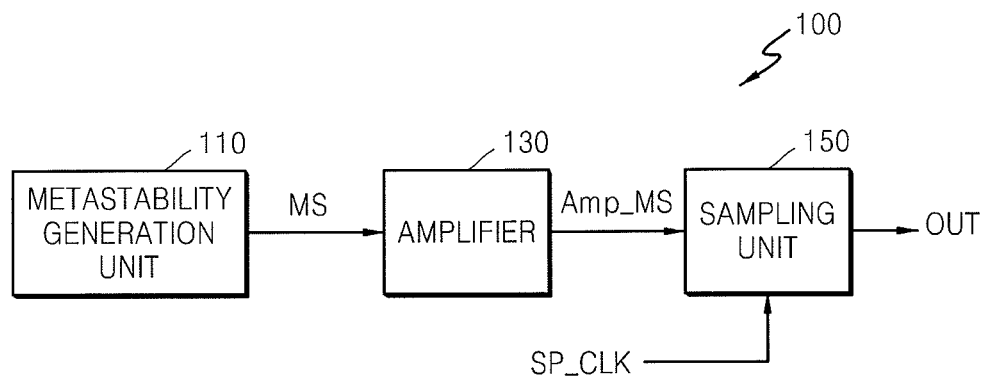
FIG. 1 is a block diagram of an apparatus for generating a random number according to an exemplary embodiment of the inventive concept.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terminology used herein is for the purpose of describing exemplary embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, elements, components and/or groups thereof. The term "and/or" used herein includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Hereinafter, exemplary embodiments of the inventive concept will be described with reference to the attached drawings that schematically illustrate the ideal exemplary embodiments of the inventive concept. In the drawings, for example, according to the manufacturing technology and/or tolerance, the modification of the illustrated shape may be expected. Thus, the exemplary embodiments of the inventive concept must not be interpreted to be limited by a particular shape that is illustrated in the drawings and must include a change in the shape occurring, for example, during manufacturing.

FIG. 1 is a block diagram of an apparatus 100 for generating a random number according to an exemplary embodiment of the inventive concept. Referring to FIG. 1, the apparatus 100 may include a metastability generation unit 110, an amplifier 130, and a sampling unit 150. The metastability generation unit 110 generates and outputs a metastability signal MS. The metastability signal MS and the metastability generation unit 110 will be described below in more detail with reference to FIGS. 2A, 2B, and 2C.

The amplifier 130 receives the metastability signal MS output from the metastability generation unit 110 and amplifies the received metastability signal MS to output an amplified metastability signal Amp_MS. The sampling unit 150 receives the amplified metastability signal Amp_MS and a sampling clock SP_CLK and samples and outputs the amplified metastability signal Amp_MS according to the sampling clock SP_CLK. An output OUT of the sampling unit 150 is a value obtained by sampling the amplified metastability signal Amp_MS according to the sampling clock SP_CLK. The output OUT has characteristics of a true random number.

Figure 2A:
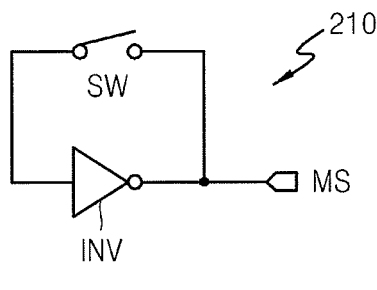
FIG. 2A is a circuit diagram of a metastability generation unit according to an exemplary embodiment of the inventive concept.

FIG. 2A is a circuit diagram of a metastability generation unit 210 according to an exemplary embodiment of the inventive concept. Referring to FIG. 2A, the metastability generation unit 210 may include an inverter INV which inverts and outputs an input signal. The inverter INV may be configured such that an input terminal and an output terminal thereof may be connected to each other and a switch SW may be connected therebetween. On/off operations of the switch SW are determined in response to a control signal (not shown) input from outside, such that when the switch SW is turned on, the input terminal and the output terminal of the inverter INV are connected to each other and the metastability signal MS is output. That is, when the input terminal and the output terminal of the inverter INV are connected in the form of a loop, an output voltage of the inverter INV converges to a metastable level and maintains that state. Due to thermal noise, the output voltage of the inverter INV probabilistically fluctuates in the metastable level.

Figure 2B:
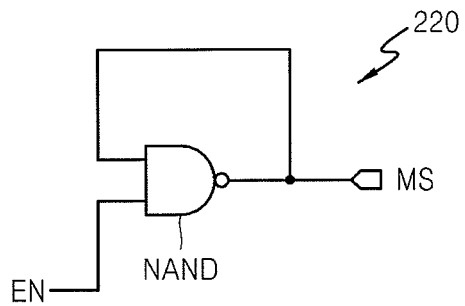
FIG. 2B is a circuit diagram of a metastability generation unit according to another exemplary embodiment of the inventive concept.

FIG. 2B is a circuit diagram of a metastability generation unit 220 according to another exemplary embodiment of the inventive concept. Referring to FIG. 2B, the metastability generation unit 220 may include a NAND gate NAND. A first input terminal of the NAND gate NAND may be connected with an output terminal of the NAND gate NAND, and an enable signal EN may be input to a second input terminal of the NAND gate NAND.

When the enable signal EN is in a logic low state, an output of the NAND gate NAND goes high and is fed back and input to the first input terminal of the NAND gate NAND. Since the enable signal EN is in the logic low state at this time, the output of the NAND gate NAND goes high and thus becomes stable upon input of the output in the logic high state to the first input terminal of the NAND gate NAND.

When the enable signal EN is in a logic high state, the logic state of the output terminal of the NAND gate NAND is an inversion of the logic state of the first input terminal of the NAND gate NAND. That is, when the enable signal EN is in the logic high state, the NAND gate NAND operates similarly to the inverter INV of FIG. 2A. Thus, when the enable signal EN is in the logic high state, the NAND gate NAND outputs the metastability signal MS.

The metastability generation unit 210 shown in FIG. 2A and the metastability generation unit 220 shown in FIG. 2B according to exemplary embodiments of the inventive concept are merely examples of the metastability generation unit 110 of FIG. 1, and, thus, various modifications, applications or configurations are possible. For example, other logic elements, such as a NOR gate or an XOR gate, may be used instead of the inverter INV shown in FIG. 2A and the NAND gate NAND shown in FIG. 2B, to implement the metastability generation unit 110 shown in FIG. 1.

Figure 2C:
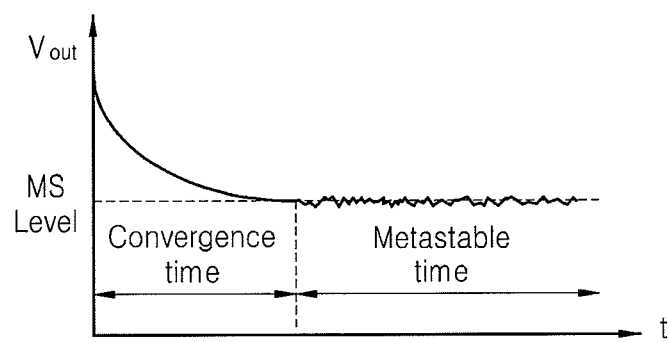
FIG. 2C is a graph of an output waveform of a metastability generation unit according to an exemplary embodiment of the inventive concept.

FIG. 2C is a graph of an output waveform of the metastability generation unit 110 illustrated in FIG. 1 according to an exemplary embodiment of the inventive concept. The output of the inverter INV for the turned-on switch SW, in FIG. 2A, and the output of the NAND gate NAND for the enable signal EN in the logic high state, in FIG. 2B, have the output waveform shown in FIG. 2C. As shown in FIG. 2C, the outputs of the metastability generation units 110, 210, and 220 have a waveform that initially converges to a predetermined value during a convergence time, and, when the waveform reaches a metastable level MS Level after a predetermined time, the waveform is output as the metastability signals MS. During a metastable time for which the metastability signals MS are output, the outputs of the metastability generation units 110, 210, and 220 minutely fluctuate from the metastable level MS Level.

Figure 3:
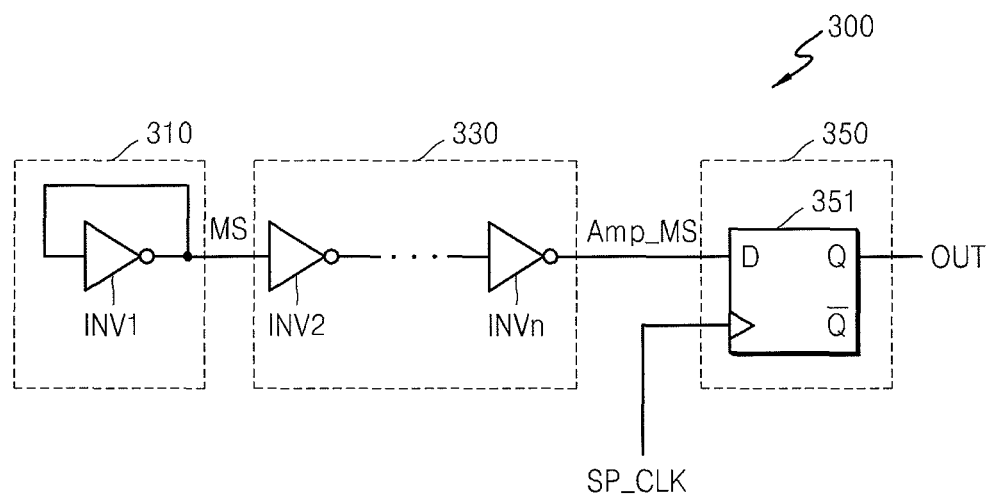
FIG. 3 is a circuit diagram of an apparatus for generating a random number according to another exemplary embodiment of the inventive concept.

FIG. 3 is a circuit diagram of an apparatus 300 for generating a random number according to a second exemplary embodiment of the inventive concept. FIG. 3 shows detailed examples of the metastability generation unit 110, the amplifier 130, and the sampling unit 150 of the apparatus 100 shown in FIG. 1. The apparatus 300 may include a metastability generation unit 310, an amplifier 330 and a sampling unit 350.

Referring to FIG. 3, the metastability generation unit 310 may include an inverter INV1 and an output terminal of the inverter INV1 may be fed back and connected to an input terminal of the inverter INV1. Like the metastability generation unit 210 shown in FIG. 2A, the metastability generation unit 310 shown in FIG. 3 may be configured such that a switch (not shown) may be connected between the output terminal and the input terminal of the inverter INV1. An operation of the metastability generation unit 310 is the same as that described with reference to FIGS. 2A and 2C and metastability generation unit 210, and, thus, will not be described herein.

The amplifier 330 receives a metastability signal MS from the metastability generation unit 310 and amplifies the received metastability signal MS to output an amplified metastability signal Amp_MS. As shown in FIG. 3, the amplifier 330 may include at least one inverter, namely, inverters INV2 through INVn which may be connected in series. The metastability signal MS input to the amplifier 330 is amplified, inverted, and output each time the metastability signal MS passes through an inverter. The metastability signal MS input to the amplifier 330 may be amplified up to a level which allows sampling by the sampling unit 350 by passing through the at least one inverter, namely, the inverters INV1, INV2, through INVn. In other words, since the metastability signal MS output from the metastability generation unit 310 minutely fluctuates from the metastable level MS Level, as shown in FIG. 2C, it is desirable to sample the metastability signal MS by the sampling unit 350 after amplifying the metastability signal MS up to a level which allows the sampling; rather than to directly sample the metastability signal MS. For example, the inverters INV1, INV2, through INVn all may be elements produced in the same process.

As mentioned above, the amplifier 330 amplifies the metastability signal MS and then outputs the amplified metastability signal Amp_MS. The amplifier 330 shown in FIG. 3 according to the exemplary embodiment of the inventive concept is only an example, and various modifications, applications or configurations may be made therefrom.

The sampling unit 350 receives the amplified metastability signal Amp_MS and a sampling clock SP_CLK and samples and outputs the amplified metastability signal Amp_MS according to the sampling clock SP_CLK. An output OUT of the sampling unit 350 is a value obtained by sampling the amplified metastability signal Amp_MS according to the sampling clock SP_CLK, and has characteristics of a true random number. For example, the sampling unit 350 may include a D flip-flop 351. A structure and operation of the D flip-flop 351 are generally known and thus will not be described herein. The sampling unit 350 shown in FIG. 3 according to the exemplary embodiment of the inventive concept is only an example, and various modifications, applications or configurations may be made therefrom.

Figure 4:
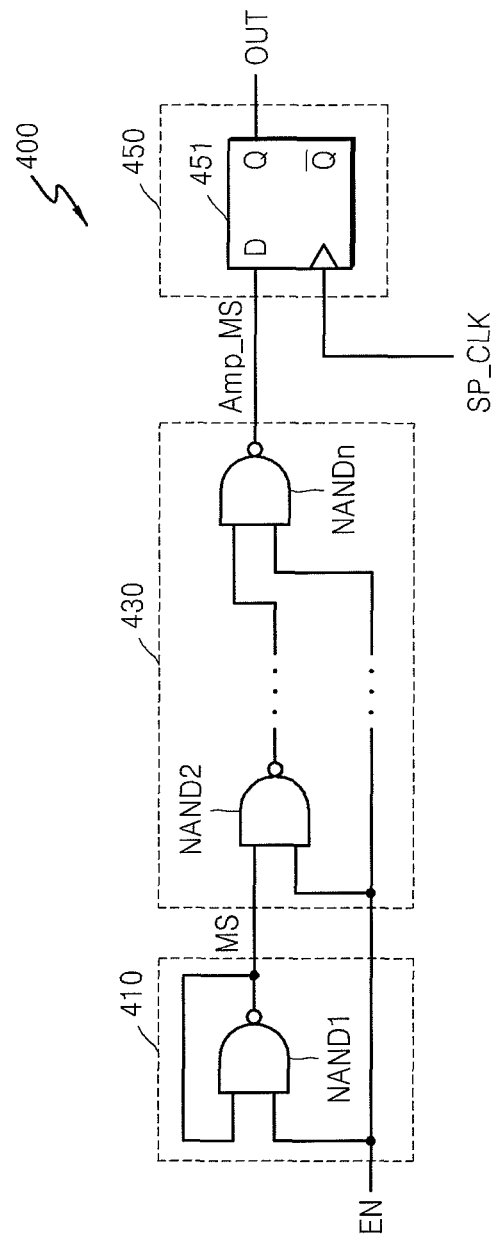
FIG. 4 is a circuit diagram of an apparatus for generating a random number according to another exemplary embodiment of the inventive concept.

FIG. 4 is a circuit diagram of an apparatus 400 for generating a random number according to an exemplary embodiment of the inventive concept. FIG. 4 shows detailed examples of the metastability generation unit 110, the amplifier 130, and the sampling unit 150 of the apparatus 100 shown in FIG. 1.

Referring to FIG. 4, the apparatus 400 may include a metastability generation unit 410, an amplifier 430, and a sampling unit 450. The metastability generation unit 410 may include a NAND gate NAND 1, a first input terminal of which may be connected to an output terminal of the NAND gate NAND1 and a second input terminal of which may have an enable signal EN input thereto. When the enable signal EN is in a logic low state, the NAND gate NAND1 outputs a stable signal; whereas when the enable signal EN is in a logic high state, the NAND gate NAND1 outputs a metastability signal MS, as described with reference to FIG. 2B and metastability generation unit 220.

The amplifier 430 receives the metastability signal MS from the metastability generation unit 410 and amplifies the received metastability signal MS to output an amplified metastability signal Amp_MS. As shown in FIG. 4, the amplifier 430 may include at least one NAND gate, namely, NAND gates NAND2 to NANDn, which may be connected in series. That is, a first input terminal of the NAND gate NAND2 may be connected to an output terminal of the NAND gate NAND1, the enable signal EN may be input to a second input terminal of the NAND gate NAND2, and an output terminal of the NAND gate NAND2 may be connected to a first input terminal of a next NAND gate (not shown). The enable signal EN may be input to a second input terminal of the next NAND gate (not shown).

The at least one NAND gate, namely, the NAND gates NAND2 to NANDn, operate similarly to inverters when the enable signal EN is in a logic high state. Thus, as described in detail with reference to FIG. 3, when the enable signal EN is in a logic high state, the metastability signal MS input to the amplifier 430 is amplified, inverted, and output each time the metastability signal MS passes through a NAND gate. The metastability signal MS input to the amplifier 430 may be amplified up to a level which allows sampling by the sampling unit 450 by passing through the at least one NAND gate, namely, the NAND gates NAND2 to NANDn.

The sampling unit 450 may include a D flip-flop 451, as illustrated in FIG. 4. The sampling unit 450 receives the amplified metastability signal Amp_MS and a sampling clock SP_CLK and samples and outputs the amplified metastability signal Amp_MS according to the sampling clock SP_CLK. An output OUT of the sampling unit 450 is a value obtained by sampling the amplified metastability signal Amp_MS according to the sampling clock SP_CLK, and has characteristics of a true random number. The sampling unit 450 has already been described with reference to FIG. 3 and thus will not be described herein. The sampling unit 450 shown in FIG. 4, according to the exemplary embodiment of the inventive concept, is only an example, and various modifications, applications or configurations may be made therefrom.

The metastability generation unit 310 and the amplifier 330 of the apparatus 300 shown in FIG. 3, according to an exemplary embodiment of the inventive concept, have been implemented using inverters, and the metastability generation unit 410 and the amplifier 430 of the apparatus 400 shown in FIG. 4 according to the exemplary embodiment of the inventive concept have been implemented using NAND gates, but the scope of the inventive concept is not limited thereto. That is, an apparatus for generating a random number according to another exemplary embodiment of the inventive concept may be implemented by using the metastability generation unit 310 shown in FIG. 3 and the amplifier 430 shown in FIG. 4, and various modifications, applications or configurations may be made therefrom.

Figure 5:
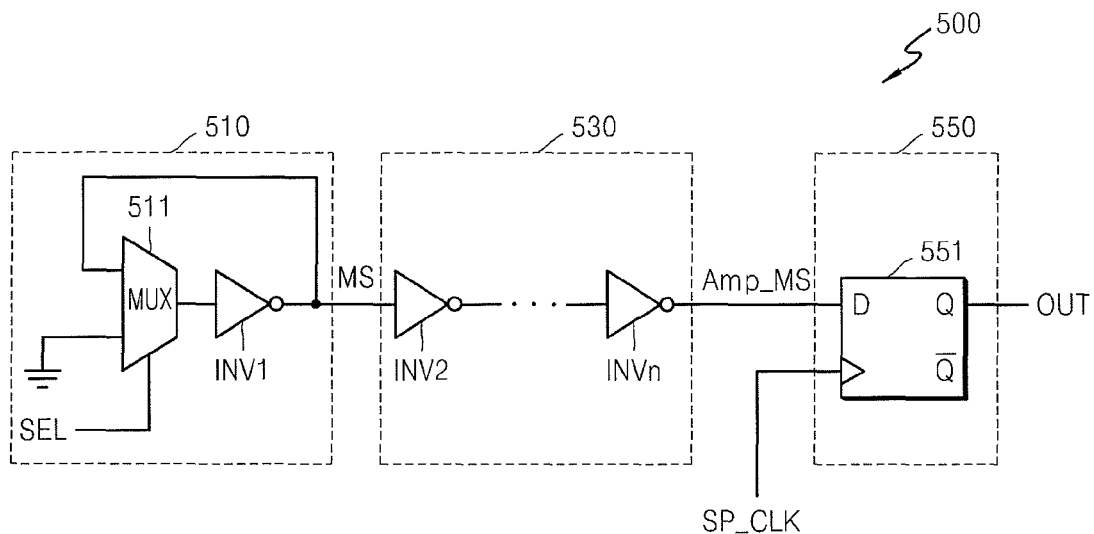
FIG. 5 is a circuit diagram of an apparatus for generating a random number according to another exemplary embodiment of the inventive concept.

FIG. 5 is a circuit diagram of an apparatus 500 for generating a random number according to an exemplary embodiment of the inventive concept. The apparatus 500 may be used in a mobile/portable device to save power. A selection signal SEL may be used to determine whether to enable a metastability generation unit 510.

The apparatus 500 may include the metastability generation unit 510, an amplifier 530, and a sampling unit 550. Structures and operations of the amplifier 530 and the sampling unit 550 are similar to the amplifier 330 and the sampling unit 350 described with reference to FIG. 3, and thus, will not be described herein. The amplifier 530 receives a metastability signal MS from the metastability generation unit 510 and amplifies the received metastability signal MS to output an amplified metastability signal Amp_MS. The sampling unit 550 may include a D flip-flop 551. The sampling unit 550 receives the amplified metastability signal Amp_MS and a sampling clock SP_CLK and samples and outputs the amplified metastability signal Amp_MS according to the sampling clock SP_CLK. An output OUT of the sampling unit 550 is a value obtained by sampling the amplified metastability signal Amp_MS according to the sampling clock SP_CLK, and has characteristics of a true random number.

Referring to FIG. 5, the metastability generation unit 510 may include a multiplexer 511 and an inverter INV1. A first input terminal of the multiplexer 511 may be connected to an output terminal of the inverter INV1, a ground voltage Vss may be connected to a second input terminal of the multiplexer 511, and an output terminal of the multiplexer 511 may be connected to an input terminal of the inverter INV1.

The multiplexer 511 receives the selection signal SEL and selectively outputs input signals according to the selection signal SEL. For example, when the selection signal SEL is in a logic low state, the multiplexer 511 may output a signal input through the first input terminal thereof; when the selection signal SEL is in a logic high state, the multiplexer 511 may output a signal input through the second input terminal thereof.

When the selection signal SEL is in the logic low state, the signal input through the first input terminal of the multiplexer 511 is output through the output terminal of the multiplexer 511, such that the output terminal and the input terminal of the inverter INV1 are connected in the form of a loop. Thus, as described with reference to FIG. 2A and metastability generation unit 210, when the selection signal SEL is in the logic low state, the inverter INV1 outputs the metastability signal MS.

When the selection signal SEL is in the logic high state, the signal input through the second input terminal of the multiplexer 511 is output through the output terminal of the multiplexer 511, such that the ground voltage Vss in the logic low state is input to the input terminal of the inverter INV1. In this case, the inverter INV1 outputs a signal in the logic high state, and when the selection signal SEL is in the logic high state, an output signal of the inverter INV1 is not fed back to the input terminal of the inverter INV1. Thus, when the selection signal SEL is in the logic high state, the metastability generation unit 510 outputs a signal having a constant level in the logic high state, rather than in the metastability state.

Alternatively, the second input terminal of the multiplexer 511 may be connected to a power voltage Vdd instead of the ground voltage Vss. In this embodiment, when the selection signal SEL is in a logic low state, the multiplexer 511 outputs the signal input through the second input terminal thereof; when the selection signal SEL is in a logic high state, the multiplexer 511 may output the signal input through the first input terminal thereof. The multiplexer 511 shown in FIG. 5 is an example of a selection means, and various modifications, applications or configurations may be made therefrom.

Figure 6:
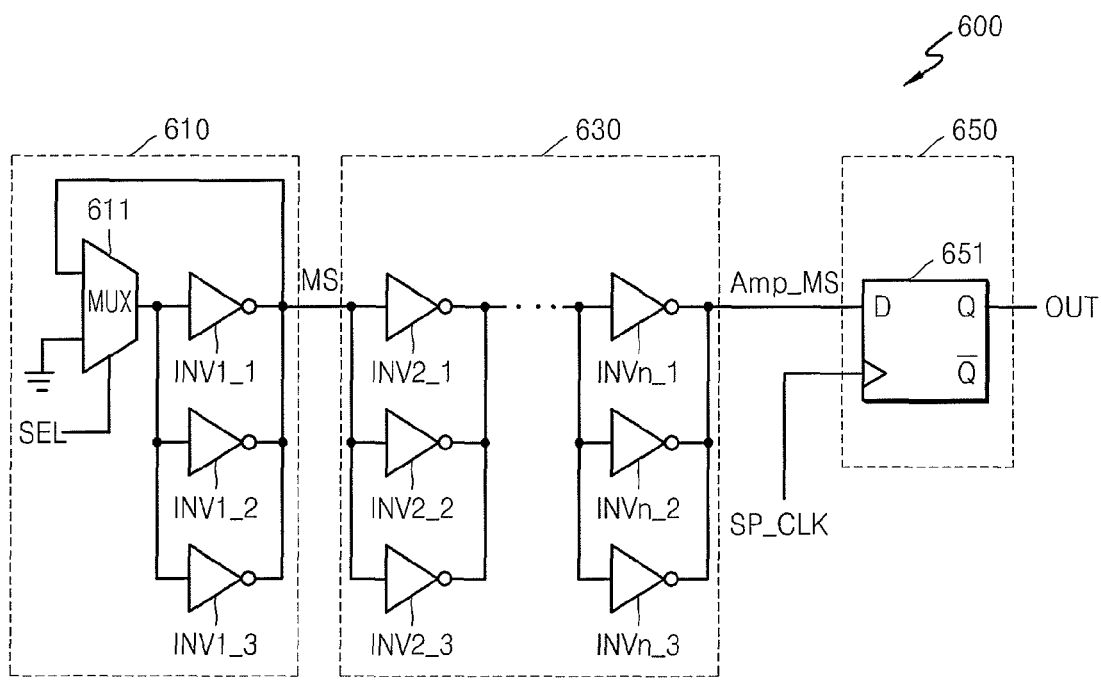
FIG. 6 is a diagram of an apparatus for generating a random number according to another exemplary embodiment of the inventive concept.

FIG. 6 is a circuit diagram of an apparatus 600 for generating a random number according to an exemplary embodiment of the inventive concept. The apparatus 600 may include a metastability generation unit 610, an amplifier 630, and a sampling unit 650. A structure and operation of the sampling unit 650 are similar to the sampling unit 350 described with reference to FIG. 3, and, thus, will not be described herein. The sampling unit 650 may include a D flip-flop 651. The sampling unit 550 receives the amplified metastability signal Amp_MS and a sampling clock SP_CLK and samples and outputs the amplified metastability signal Amp_MS according to the sampling clock SP_CLK. An output OUT of the sampling unit 550 is a value obtained by sampling the amplified metastability signal Amp_MS according to the sampling clock SP_CLK, and has characteristics of a true random number.

Referring to FIG. 6, the metastability generation unit 610 may include a plurality of inverters which invert and output an input signal. The plurality of inverters may be connected in parallel and output terminals of each of the plurality of inverters may be connected to each other. For example, as shown in FIG. 6, the plurality of inverters may be implemented by a plurality of inverters INV1_1, INV1_2, and INV1_3. As described with reference to FIGS. 2B and 4, the plurality of inverters may be implemented using other logic elements such as a NAND gate, a NOR gate, or an XOR gate. While the metastability generation unit 610 according to the exemplary embodiment of the inventive concept includes three inverters in FIG. 6, the scope of the inventive concept is not limited thereto.

The metastability generation unit 610 may include the plurality of inverters INV1_1, INV1_2, and INV1_3. The metastability generation unit 610 may further include a multiplexer 611. Input terminals of the plurality of inverters INV1_1, INV1_2, and INV1_3 may be connected to an output terminal of the multiplexer 611, and output terminals of the plurality of inverters INV1_1, INV1_2, and INV1_3 may be connected to a first input terminal of the multiplexer 611. That is, the plurality of inverters INV1_1, INV1_2, and INV1_3 may be connected in parallel. A ground voltage Vss may be connected to a second input terminal of the multiplexer 611, and the multiplexer 611 may selectively output an input signal according to a selection signal SEL. For example, when the selection signal SEL is in a logic low state, the multiplexer 611 may output a signal input through the first input terminal thereof; when the selection signal SEL is in a logic high state, the multiplexer 611 may output a signal input through the second input terminal thereof.

As shown in FIG. 6, when the metastability generation unit 610 includes the plurality of inverters INV1_1, INV1_2, and INV1_3 which are connected in parallel, mismatch among the plurality of inverters INV1_1, INV1_2, and INV1_3 may be reduced. That is, characteristics of transistors, even though produced in the same process, may vary slightly due to process variations. The metastability generation unit 610 shown in FIG. 6, however, is configured to have the plurality of inverters INV1_1, INV1_2, and INV1_3 connected in parallel, thereby reducing the mismatch among transistors. That is, the apparatus 600 may be useful when a yield of the apparatus 600 is small due to large process variations.

The amplifier 630 includes a plurality of amplification stages which amplify and output an input signal. The plurality of amplification stages may be connected in series. Each of the plurality of amplification stages may include a plurality of unit amplification circuits which amplify and output an input signal, and the plurality of unit amplification circuits may be connected in parallel. For example, as shown in FIG. 6, the plurality of unit amplification circuits may be implemented by a plurality of inverters INV2_1, INV2_2, and INV2_3. The plurality of unit amplification circuits may also be implemented by other logic elements such as a NAND gate, a NOR gate, or an XOR gate, as described with reference to FIG. 4.

Referring to FIG. 6, each group of the plurality of inverters INV2_1, INV2_2, and INV2_3 connected in parallel corresponds to a unit amplification circuit, and the plurality of inverters INV2_1, INV2_2, and INV2_3 together correspond to an amplification stage. The amplifier 630 may include a plurality of amplification stages connected in series. As mentioned previously, when the plurality of inverters INV2_1, INV2_2, and INV2_3 are connected in parallel, mismatch among the plurality of inverters INV2_1, INV2_2, and INV2_3 may be reduced.

Figure 7:
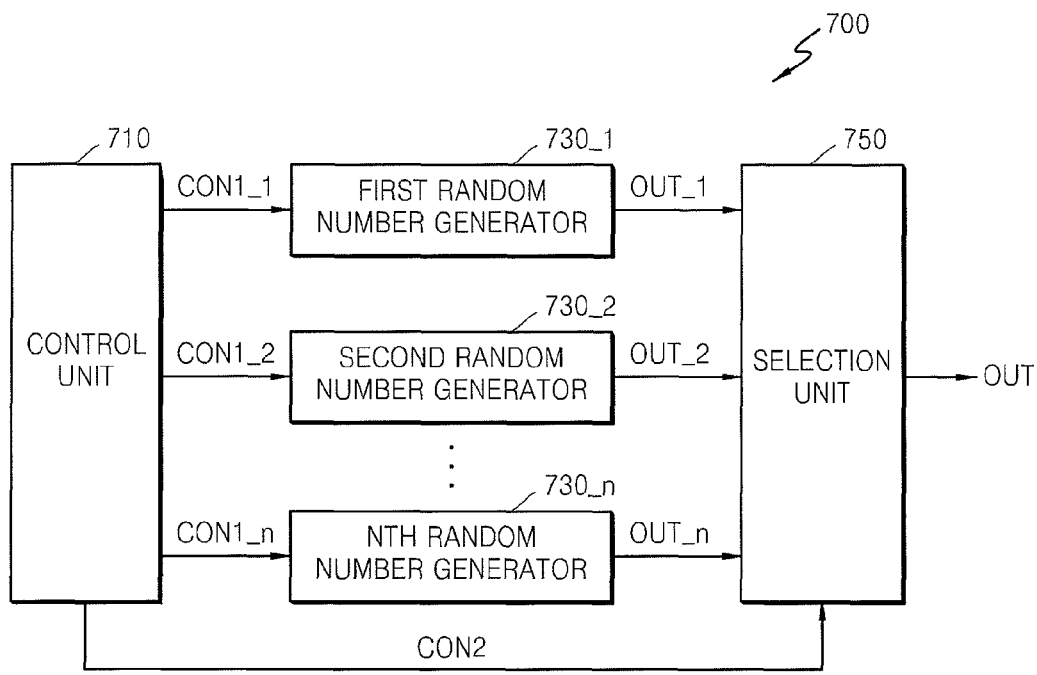
FIG. 7 is a block diagram of an apparatus for generating a random number according to another exemplary embodiment of the inventive concept.

FIG. 7 is a block diagram of an apparatus 700 for generating a random number according to an exemplary embodiment of the inventive concept. Referring to FIG. 7, the apparatus 700 may include a control unit 710, a plurality of random number generators 730_1, 730_2, through 730_n, and a selection unit 750. Each of the plurality of random number generators 730_1, 730_2, through 730_n may include a metastability generation unit, an amplifier, and a sampling unit, as described with reference to FIGS. 1, 3, 4, 5, and 6. The plurality of random number generators 730_1, 730_2, through 730_n have already been described with reference to FIGS. 1, 3, 4, 5, and 6, and thus, will not be described herein.

Referring to FIG. 7, the control unit 710 respectively provides first control signals CON1_1, CON1_2, through CON1_n to the plurality of random number generators 730_1, 730_2, through 730_n, and generates a second control signal CON2 and outputs the second control signal CON2 to the selection unit 750. The first control signals CON1_1, CON1_2, through CON1_n may include a sampling clock input to a sampling unit of each of the plurality of random number generators 730_1, 730_2, through 730_n, and a selection signal SEL input to a metastability generation unit of each of the plurality of random number generators 730_1, 730_2, through 730_n.

The selection unit 750 may receive output signals OUT_1, OUT_2, through OUT_n respectively output from the plurality of random number generators 730_1, 730_2, through 730_n and the second control signal CON2 output from the control unit 710, and selectively output the output signal OUT of the apparatus 700 according to the second control signal CON2. For example, the selection unit 750 may include a multiplexer which selectively outputs the output signals OUT_1, OUT_2, through OUT_n respectively output from the plurality of random number generators 730_1, 730_2, through 730_n according to the second control signal CON2. The second control signal CON2 may include a selection signal for selecting an output of the multiplexer.

The apparatus 700 shown in FIG. 7 according to the exemplary embodiment of the inventive concept may increase its throughput by connecting the plurality of random number generators 730_1, 730_2, through 730_n in parallel.

While each of the plurality of random number generators 730_1, 730_2, through 730_n may include a sampling unit based on the foregoing description with reference to FIG. 7, the inventive concept is not limited thereto. For example, each of the plurality of random number generators 730_1, 730_2, through 730_n may include a metastability generation unit and an amplifier and a single sampling unit may be connected to the plurality of random number generators 730_1, 730_2, through 730_n. Such a structure will be described below in more detail with reference to FIG. 12.

Figure 8:
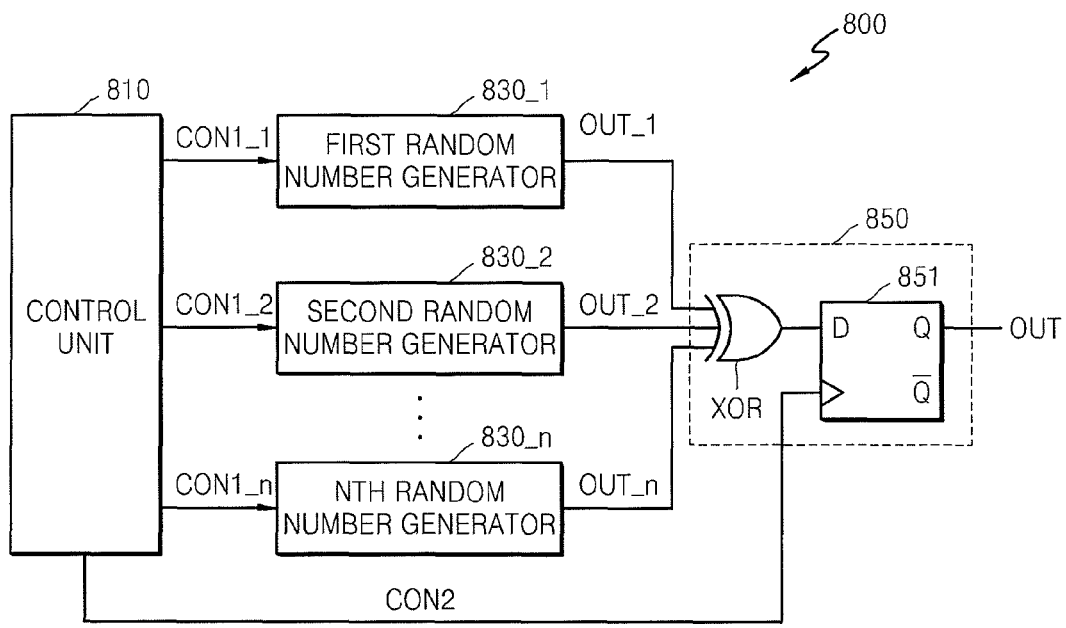
FIG. 8 is a block diagram of an apparatus for generating a random number according to another exemplary embodiment of the inventive concept.

FIG. 8 is a block diagram of an apparatus 800 for generating a random number according to an exemplary embodiment of the inventive concept. Referring to FIG. 8, the apparatus 800 may include a control unit 810, a plurality of random number generators 830_1, 830_2, through 830_n, and a selection unit 850. The control unit 810, the control signals CON1_1, CON1_2, and CON1_3, and the plurality of random number generators 830_1, 830_2, through 830_n, respectively are the same as the control unit 710, the control signals CON1_1, CON1_2, and CON1_3, and the plurality of random number generators 730_1, 730_2, through 730_n described with reference to FIG. 7, and thus, will not be described herein.

Referring to FIG. 8, the selection unit 850 may include an XOR gate XOR and a flip-flop 851. The XOR gate XOR performs an XOR operation on signals OUT_1, OUT_2, through OUT_n output from the plurality of random number generators 830_1, 830_2, through 830_n, respectively, and outputs an XOR result. The flip-flop 851 receives an output signal of the XOR gate XOR and samples and outputs the received output signal of the XOR gate XOR as output signal OUT according to a second control signal CON2. The second control signal CON2 may include a sampling clock.

Since the apparatus 800 shown in FIG. 8 according to the exemplary embodiment of the inventive concept performs an XOR operation on the signals OUT_1, OUT_2, through OUT_n output from the plurality of random number generators 830_1, 830_2, through 830_n, respectively, probabilistic characteristics of the apparatus 800 are defined by probabilistic characteristics of one of the plurality of random number generators 830_1, 830_2, through 830_n, which has the best probabilistic characteristics. For example, due to characteristics of an XOR operation, if any one of a plurality of random number generators has good probabilistic characteristics, an output of all of the plurality of random number generators also has good probabilistic characteristics. Herein, having good probabilistic characteristics means having characteristics close to a true random number.

Figure 9:
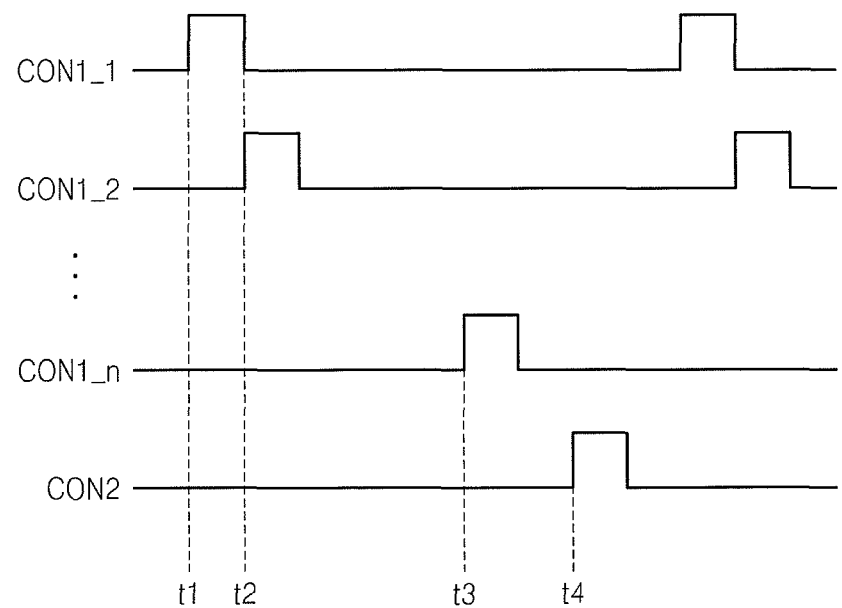
FIG. 9 is a timing diagram of a sampling clock input to a plurality of random number generators according to an exemplary embodiment of the inventive concept.

FIG. 9 is a timing diagram of a sampling clock input to a plurality of random number generators according to an exemplary embodiment of the inventive concept. In the plurality of random number generators shown in FIG. 7 or FIG. 8, the first control signals CON1_1, CON1_2, through CON1_n input to the plurality of random number generators may have waveforms similar to those shown in FIG. 9.

Referring to FIGS. 8 and 9, the first control signals CON1_1, CON1_2, through CON1_n input to the plurality of random number generators 830_1, 830_2, through 830_n, respectively, may have different time delays on a time axis. Thus, sampling times of the first control signals CON1_1, CON1_2, through CON1_n input to the plurality of random number generators 830_1, 830_2, through 830_n, respectively, are different from one another, such that sampling is performed for the plurality of random number generators 830_1, 830_2, through 830_n at different times. For example, sampling for the random number generator 830_1 to which the first control signal CON1_1 is input may be performed at a time t1, sampling for the random number generator 830_2 to which the first control signal CON1_2 is input may be performed at a time t2, and sampling for the random number generator 830_n to which the n$^{th}$ control signal CON1_n is input may be performed at a time t3. As shown in FIG. 9, sampling by the sampling unit 850 to which the second control signal CON2 is input may be performed at a time t4.

In the case of an apparatus for generating a random number which includes a plurality of random number generators, a cross-talk phenomenon may occur among the random number generators, resulting in a poor output of the apparatus. That is, to reduce a parasitic effect such as interference, sampling clocks having different time delays may be provided to the random number generators, respectively.

Figure 10:
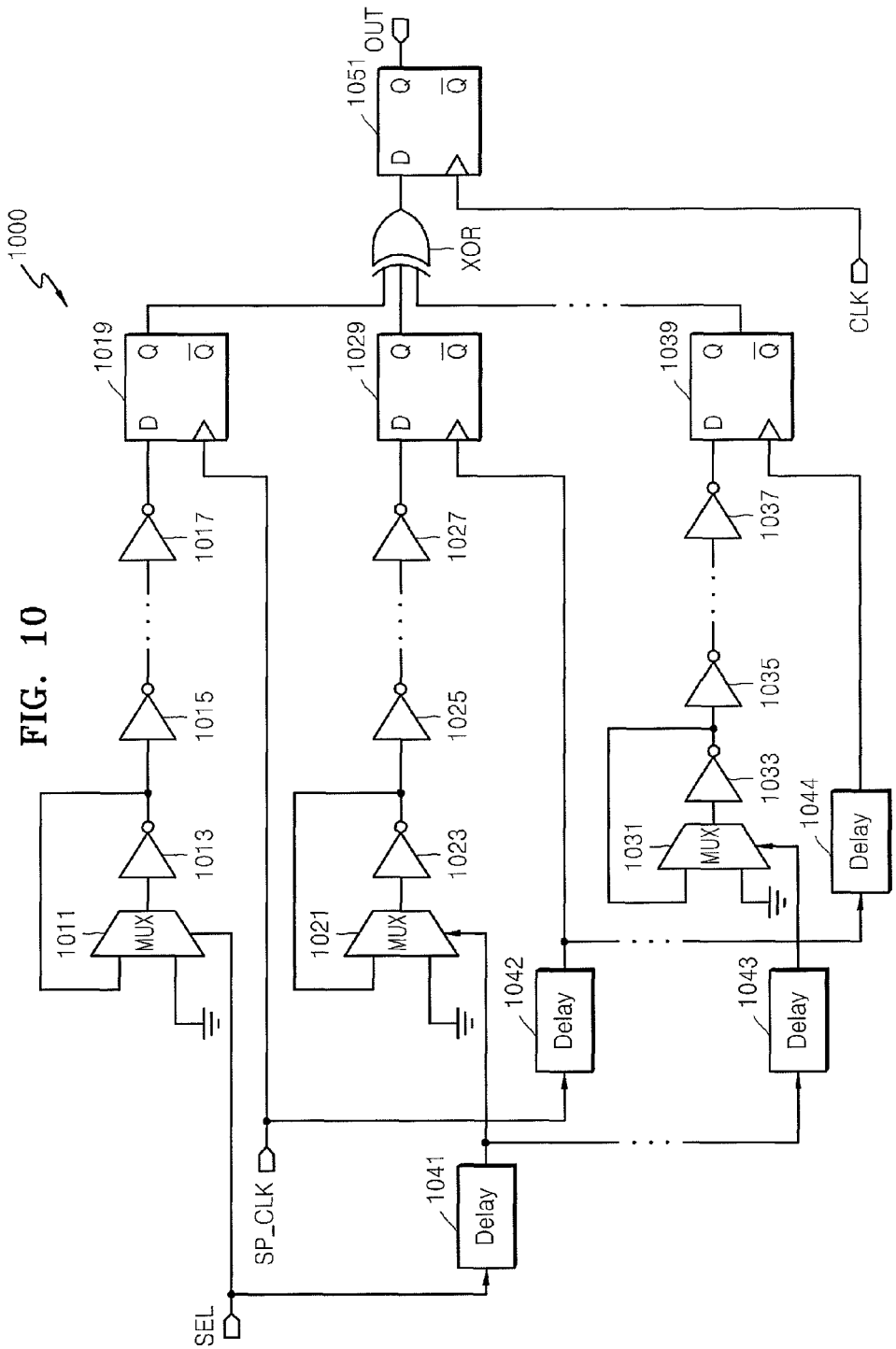
FIG. 10 is a circuit diagram of an apparatus for generating a random number according to another exemplary embodiment of the inventive concept.

FIG. 10 is a circuit diagram of an apparatus 1000 for generating a random number according to an exemplary embodiment of the inventive concept. To generate sampling clocks having different time delays, the apparatus 1000 may include at least one delay unit, namely, delay units 1041, 1042, 1043, and 1044. As shown in FIG. 10, a sampling clock SP_CLK is input to a flip-flop 1019, a signal obtained by delaying the sampling clock SP_CLK by the delay unit 1042 is input to a flip-flop 1029, and a signal obtained by delaying the sampling clock SP_CLK by the delay units 1042 and 1044 is input to a flip-flop 1039. Similarly to the sampling clock SP_CLK, selection signals SEL having different time delays are input to the multiplexers 1011, 1021, and 1031, respectively. The selection signal SEL is input to multiplexer 1011, a signal obtained by delaying the selection signal SEL by delay unit 1041 is input to multiplexer 1021, and a signal obtained by delaying the selection signal SEL by delay unit 1041 and 1043 is input to multiplexer 1031. The inverters 1015, 1017, 1025, 1027, 1035 and 1037 are amplifiers, respectively, 1019, 1029 and 1039 are sampling units, respectively, and XOR gate XOR and flip-flop 1051 are a selection unit. A detailed operation of the apparatus 1000 shown in FIG. 10 has already been described with reference to FIGS. 8 and 9, and thus, will not be described herein.

Figure 11:
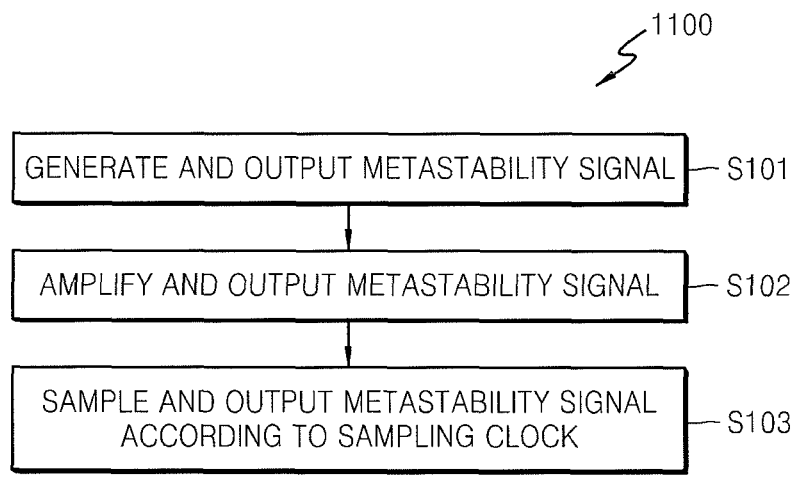
FIG. 11 is a flowchart of a method of generating a random number according to an exemplary embodiment of the inventive concept.

FIG. 11 is a flowchart of a method 1100 of generating a random number according to an exemplary embodiment of the inventive concept. Referring to FIG. 11, the method 1100 includes operation S101 of generating and outputting a metastability signal, operation S102 of receiving the metastability signal, amplifying the received metastability signal, and outputting an amplified metastability signal, and operation S103 of receiving the amplified metastability signal and a sampling clock and sampling and outputting the amplified metastability signal according to the sampling clock. The method 1100 has already been described sufficiently, and thus, will not be described herein.

The apparatus and method of generating a random number according to the inventive concept may increase throughput of a true random number generator by using metastability. The apparatus and method of generating a random number according to the inventive concept do not need a special layout design and may be implemented by a general digital component.

Figure 12:
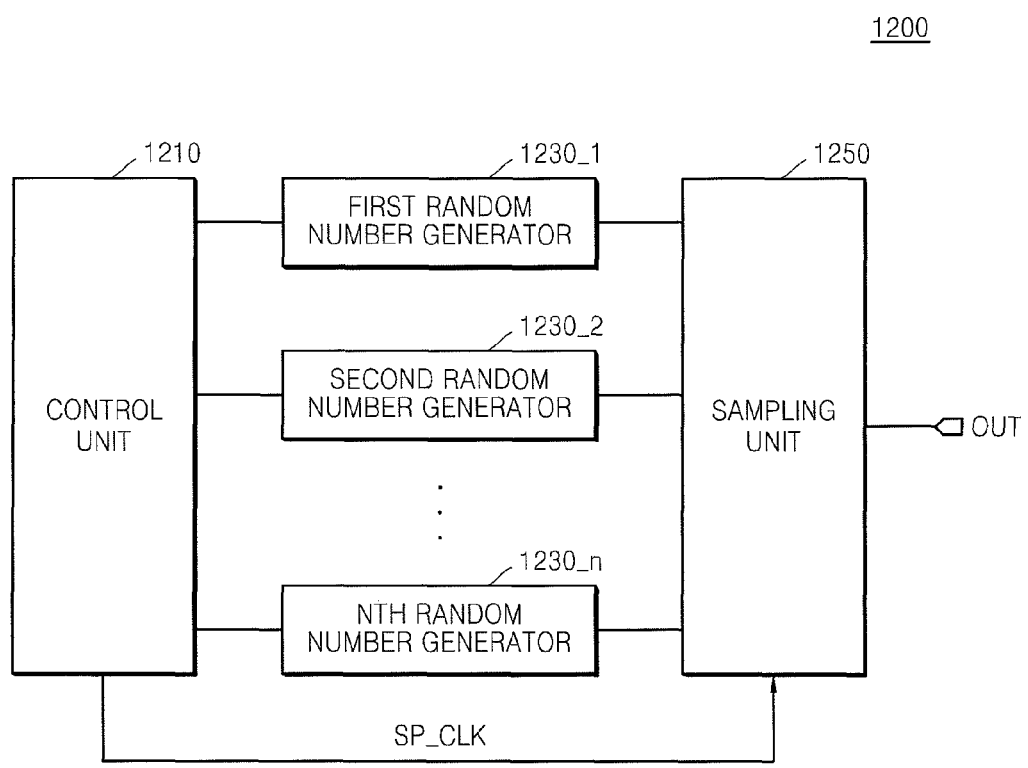
FIG. 12 is a block diagram of an apparatus for generating a random number according to another exemplary embodiment of the inventive concept.
Figure 13:
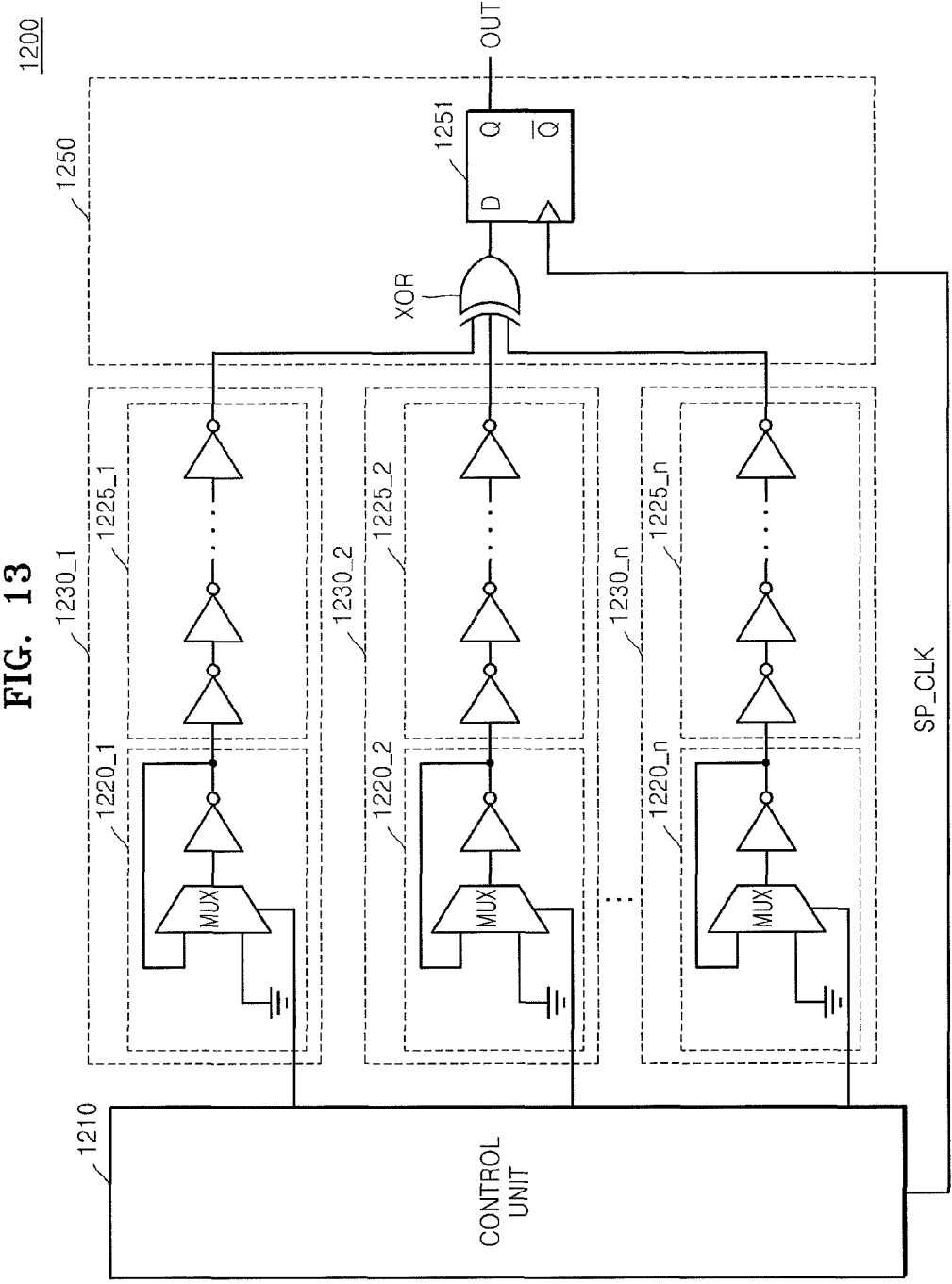
FIG. 13 is a detailed block diagram of the apparatus for generating a random number of FIG. 12.

FIG. 12 is a block diagram of an apparatus 1200 for generating a random number according to another exemplary embodiment of the inventive concept, and FIG. 13 is a detailed block diagram of the apparatus 1200 shown in FIG. 12. The apparatus 1200 may be modified examples of the apparatus 700 shown in FIG. 7 and the apparatus 1000 shown in FIG. 10. Therefore, a repetitive description on the same components of the embodiments is omitted.

Referring to FIGS. 12 and 13, the apparatus 1200 may include random number generators 1230_1, 1230_2, through 1230_n. A random number generator 1230_n may include a metastability signal generation unit 1220_n and an amplifier 1225_n. For example, the random number generator 1230_1 may include a metastability signal generation unit 1220_1 and an amplifier 1225_1, and a random number generator 1230_2 may include a metastability signal generation unit 1220_2 and an amplifier 1225_2.

A sampling unit 1250 may be connected with the random number generators 1230_1, 1230_2, through 1230_n to sample output signals of the random number generators 1230_1, 1230_2, through 1230_n. For example, the sampling unit 1250 may include an XOR gate XOR and a flip-flop 1251.

The XOR gate XOR may perform an XOR operation on amplified signals of the amplifiers 1225_1 through 1225_n and output an XOR result. For example, the XOR gate XOR may output a high signal if the number of amplified signals at a high level among the input amplified signals is an even number, and may output a low signal if the number of amplified signals at a high level among the input amplified signals is an odd number. Through the XOR operation, entropy of each of the random number generators 1230_1, 1230_2, through 1230_n, that is, uncertainty about whether a signal is at the high level or the low level, is added, so that an apparatus for generating a random number having high entropy may be implemented.

The flip-flop 1251 may sample and output an output signal of the XOR gate XOR. For example, if the flip-flop 1251 is a D flip-flop and a cycle of the sampling clock SP_CLK provided from a control unit 1210 is 1 μs, the D flip-flop may store and output a state of the output signal of the XOR gate XOR, that is, the high state or the low state, every 1 μs.

Entropy obtained by the XOR operation may be expressed as Equation 1 below. Letting entropy of the random number generator 1230_1 be $\epsilon_{MS1}$, entropy of the random number generator 1230_2 be $\epsilon_{MS2}$, and entropy of the random number generator 1230_n be $\epsilon_{MSn}$, the entropy of the apparatus 1200 according to the current embodiment may be expressed as:

$$\epsilon_{MS} = \epsilon_{MS1} + \epsilon_{MS2} + \ldots + \epsilon_{MSn} = \Sigma \epsilon_{MSi} \quad (1)$$

As such, the apparatus 1200 according to the current embodiment has high entropy which is a sum of all the entropy of a plurality of random number generators, thereby generating a high-quality true random number.

Figure 14:
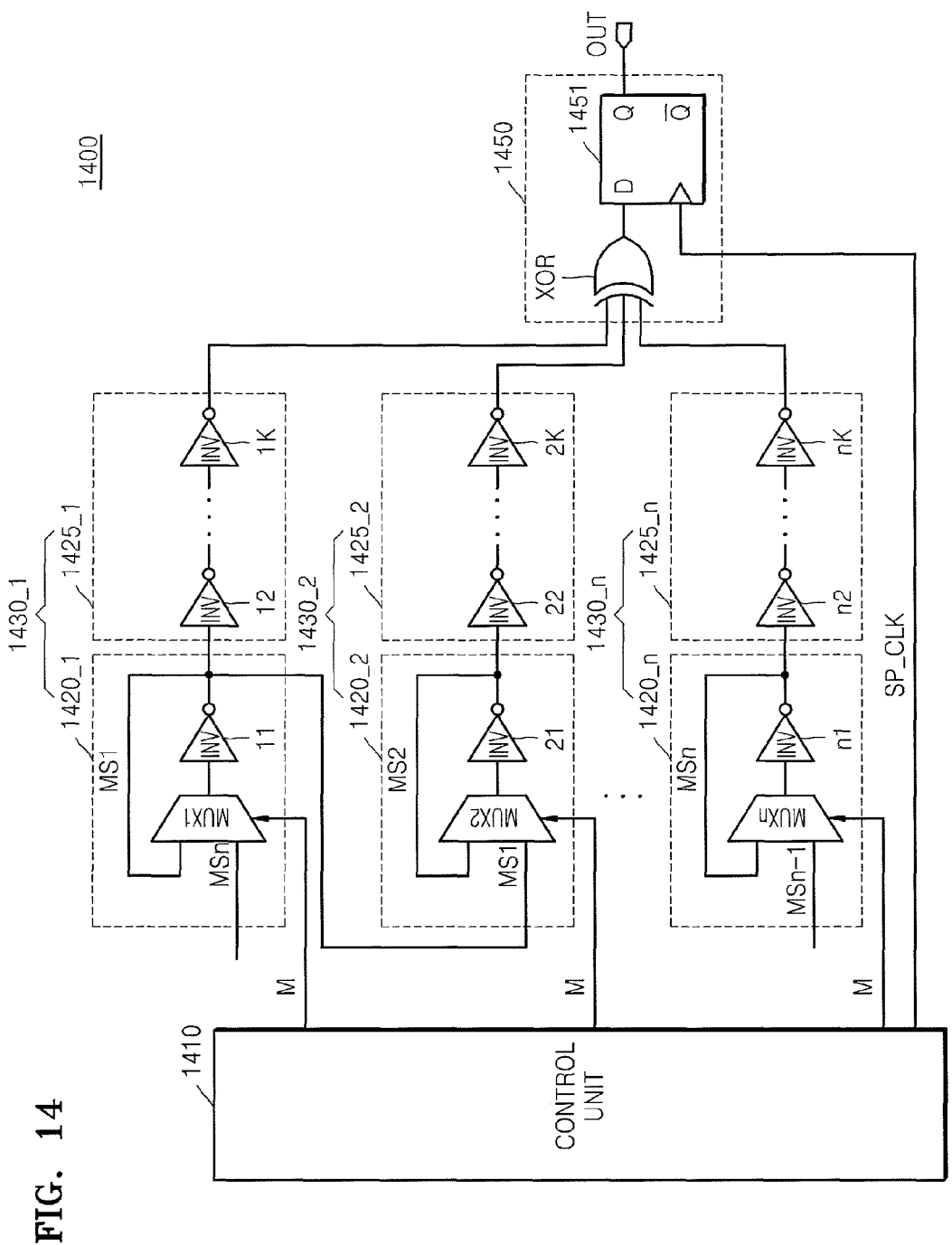
FIG. 14 is a block diagram of an apparatus for generating a random number according to another exemplary embodiment of the inventive concept.

FIG. 14 is a block diagram of an apparatus 1400 for generating a random number according to another exemplary embodiment of the inventive concept. The apparatus 1400 according to the current embodiment may be a modified example of the apparatus 1200 according to the embodiment shown in FIG. 13. Therefore, a repetitive description on the same components of the embodiments is omitted.

Referring to FIG. 14, the apparatus 1400 may include a plurality of random number generators 1430_1, 1430_2, through 1430_n. In a first mode, each of the plurality of random number generators 1430_1, 1430_2, through 1430_n generates a metastability signal and generates a random number by using the generated metastability signal. In the second mode, the plurality of random number generators 1430_1, 1430_2, through 1430_n may be connected to each other to function as a ring oscillator.

Each of metastability generation units 1420_1, 1420_2, through 1420_n of the corresponding random number generator 1430_1, 1430_2, through 1430_n may generate and output metastability signals in the first mode and may receive and amplify an output signal of a different random number generator in the second mode.

For example, when the metastability generation units 1420_1, 1420_2, through 1420_n are implemented by inverters INV 11, INV 21, through INV n1, input terminals of the inverters INV 11, INV 21, through NV n1 may be connected with output terminals thereof in the first mode, so that the inverters INV 11, INV 21, through INV n1 may generate metastability signals. In the second mode, the input terminals of the inverters INV 11, INV 21, through INV n1 may be connected with a different random number generator, so that the inverters INV 11, INV 21, through INV n1 may function as simple inversion amplifiers.

In this case, the metastability generation units 1420_1, 1420_2, through 1420_n may further include multiplexers MUX1, MUX2, through MUXn which selectively output input signals in response to mode signals M applied from a control unit 1410.

First input terminals of the multiplexers MUX1, MUX2, through MUXn may be connected with the output terminals of the metastability generation units 1420_1, 1420_2, through 1420_n, and thus, in the first mode (for example, when the mode signals M are in the low state), the input terminals and the output terminals of the inverters INV 11, INV 21, through INV n1 are connected to each other, such that the metastability signals may be generated. Second input terminals of the multiplexers MUX1, MUX2, through MUXn may be connected with a different random number generator, and thus, in the second mode (for example, when the mode signals M are in the high state), the inverters INV 11, INV 21, through INV n1 may invert and amplify a signal generated by a different number generator. For example, the metastability signal MS1 from inverter INV 11 is input to the second input terminal of the multiplexer MUX2.

Figure 15:
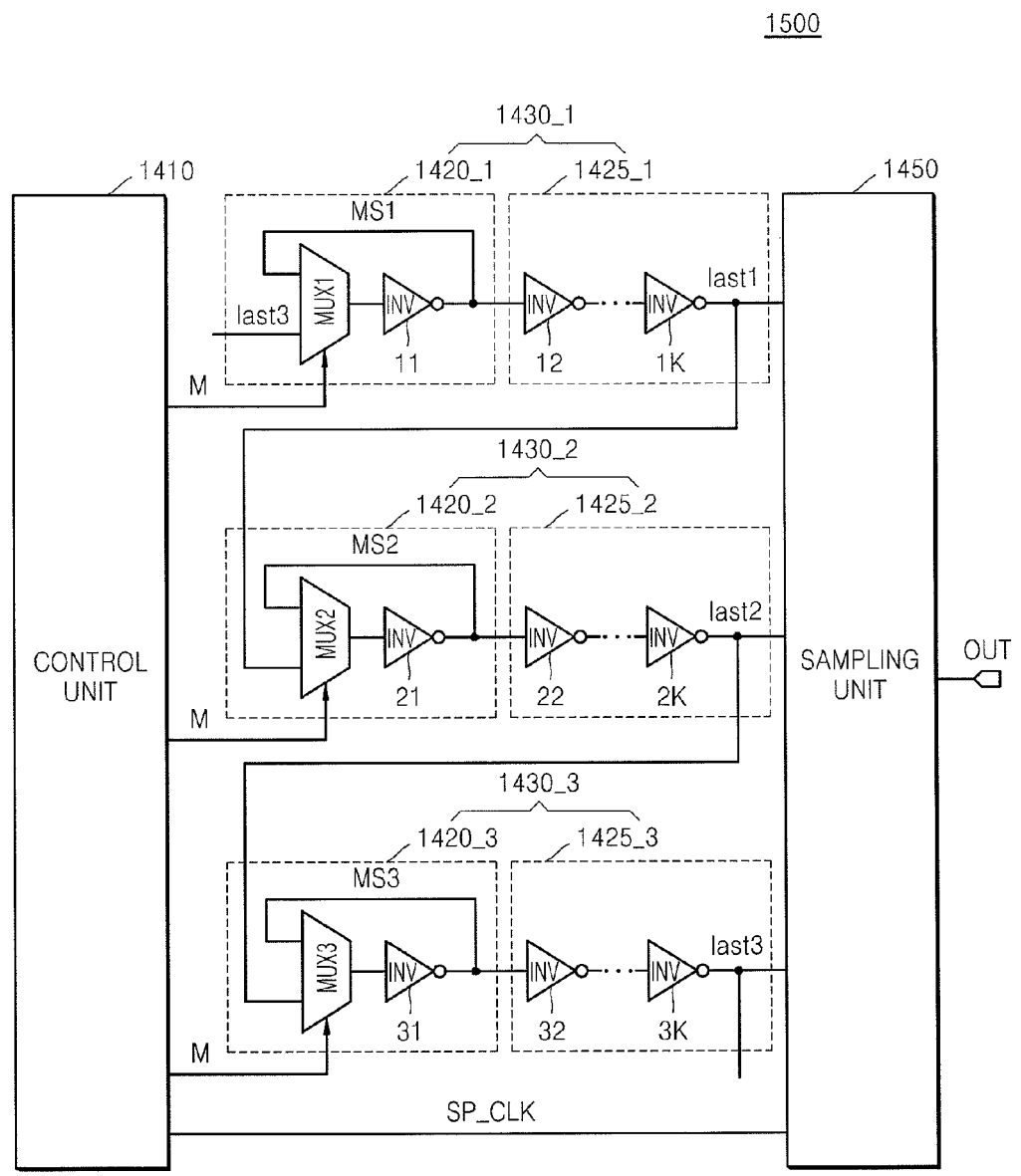
FIG. 15 is a block diagram of an apparatus for generating a random number according to another exemplary embodiment of the inventive concept.

While the second input terminals of the multiplexers MUX1, MUX2, through MUXn are connected to output terminals of the metastability generation units 1420_1, 1420_2, through 1420_n (that is, inverters) of a different random number generator in FIG. 14, the inventive concept is not limited thereto. As shown in FIG. 15, second input terminals of multiplexers MUX1, MUX2, and MUX3 may be connected to output terminals of amplifiers 1425_1, 1425_2, and 1425_3 of a different random number generator. For example, the output of amplifier 1425_1 last1 is connected to the second input terminal of multiplexer MUX2. That is, the apparatus 1400 generates a random number through the multiplexers MUX1, MUX2, and MUX3 according to a metastability generation principle in the first mode and generates a random number by operating as a ring oscillator in the second mode.

Hereinafter, a detailed description will be made of operations of the apparatus 1400 in the first mode ("metastability mode") and the second mode ("oscillation mode").

First Mode: Metastability Mode

In the first mode, the multiplexer MUX1 of the random number generator 1430_1 may receive a mode signal M in the low state from the control unit 1410 and electrically connect the first input terminal of the multiplexer MUX1 with the input terminal of the inverter INV 11. Since the first input terminal of the multiplexer MUX1 is connected with the output terminal of the inverter INV 11, the input terminal and the output terminal of the inverter INV 11 are connected to each other. Therefore, as described with reference to FIG. 1, the inverter INV 11 may generate a metastability signal based on thermal noise.

Such a connection relationship may apply to the multiplexer MUX2 of the random number generator 1430_2 through the multiplexer MUXn of the random number generator 1430_n. In this case, each of the random number generators 1430_1, 1430_2, through 1430_n generates a random number and outputs the generated random number to a sampling unit 1450, such that the apparatus 1400 may have high entropy as expressed by Equation (1) described with reference to FIG. 13.

Second Mode: Oscillation Mode

In the second mode, the multiplexer MUX1 of the random number generator 1430_1 may receive a mode signal M in the high state from the control unit 1410 and electrically connect the second input terminal of the multiplexer MUX1 with the input terminal of the inverter INV 11 of the random number generator 1430_1. Since the second input terminal of the multiplexer MUX1 is connected with the output terminal of the inverter INV n1 of the random number generator 1430_n, the input terminal of the inverter INV 11 of the random number generator 1430_1 and the output terminal of the inverter INV n1 of the random number generator 1430_n are connected to each other. Thus, the inverter INV 11 inverts and amplifies the output signal of the inverter INV n1 of the random number generator 1430_n.

As shown in FIG. 14, in the second mode, the multiplexers MUX1, MUX2, through MUXn may invert and amplify an output signal of an inversion unit of a different random number generator. For example, once an output signal of the inverter INVn1 of the random number generator 1430_n is inverted and amplified by the inverter INV11 of the random number generator 1430_1, the output signal is input to the second input terminal of the multiplexer MUX2 of the random number generator 1430_2.

Like the multiplexer MUX1, the multiplexer MUX2 also receives the mode signal M in the high state and connects the second input terminal of the multiplexer MUX2 with the input terminal of the inversion unit INV 21 of the random number generator 1430_2. Thus, the output signal of the inverter INV 11 of the random number generator 1430_1 may be inverted and amplified by the inversion unit INV 21 of the random number generator 1430_2.

Through such a connection among the multiplexers MUX1 through MUXn, in the second mode, the apparatus 1400 functions as a ring oscillator which continuously inverts and amplifies an output signal. However, oscillation may be achieved when such an inversion and amplification are performed an odd-number of times, and thus, in the current embodiment, the number of random number generators may be an odd number. Hereinafter, an operation of the ring oscillator in the oscillation mode will be described in more detail.

<During Initial Period of Second Mode (Oscillation Mode)>

The ring oscillator performs an oscillation operation. Thus, the ring oscillator repeats transition to the high state or the low state, and the ring oscillator, when sampled at an arbitrary moment, may provide a high-level voltage or a low-level voltage.

At the moment of entering the second mode, a voltage amplified by the ring oscillator may be a high-level voltage or a low-level voltage. Whether the voltage is at the high level or the low level is unpredictable because it depends on an output signal in the first mode (metastability mode). Thus, wherein $U_{th}$ indicates a threshold level value, A indicates an amplitude of a sine function, and $\omega_o$ indicates each frequency of the ring oscillator, an oscillation signal output from an output terminal of each of the random number generators 1430_1, 1430_2, through 1430_n may be expressed as:

$$U_{OSC}(t) = U_{th} + A\sin(\omega_o t + \phi_0) \quad (2)$$

That is, the ring oscillator performs an inversion operation of continuously inverting a logic level during the initial period. Thus, a signal in the form of a sine wave curve, which has a predetermined cycle, is output. The output signal is a stable oscillation signal that has a predetermined duty cycle. However, it should be noted that the signal in the form of a sine wave curve has a randomized initial phase $\phi_0$.

Therefore, when the sampling unit 1450 samples an output signal of the output terminal of each of the random number generators 1430_1, 1430_2, through 1430_n in the initial period of the second mode (oscillation mode), the output signal may have a random state between the high state or the low state due to thermal noise at the sampling moment. Thus, the apparatus 1400 may generate a true random number when operating as the ring oscillator during the initial period, and, in this case, entropy of the apparatus 1400 may be expressed as $\epsilon_{\phi_0}$.

After Initial Period of Second Mode (Oscillation Mode)

After the initial period, the ring oscillator has jitter while performing an oscillation operation, thus outputting an oscillation signal having an irregular cycle.

More specifically, as the ring oscillator continues performing the oscillation operation, noise increases in the oscillation signal, such that the ring oscillator outputs the oscillation signal having jitter. Herein, the jitter indicates a deviation of a signal on a time axis, and the oscillation signal output from an output terminal of each of the plurality of random number generators 1430_1, 1430_2, through 1430_n may be expressed as:

$$U_{OSC}(t) = U_{th} + A\cdot\sin(\omega_o t + \phi_0 + \phi_j(t)) \quad (3),$$

wherein $U_{th}$ indicates a threshold level value, A indicates an amplitude of a sine function, and $\omega_o$ indicates each frequency of the ring oscillator, which may be expressed as:

$$\omega_o = 2\pi f_0 = 2\pi \frac{1}{T_0} = 2\pi \frac{1}{\tau_1 + \tau_2 + \ldots + \tau_1}, \quad (4)$$

wherein $\tau_i$ indicates a time delay value of an $i^{th}$ inversion unit INV.

Since jitter is a function of time, the ring oscillator has an irregular cycle and outputs the oscillation signal having an irregular duty cycle. Through a sampling operation based on the signal having the irregular cycle, a true random number may be generated. In this case, entropy of the apparatus 1400 for generating a random number may be expressed as $\epsilon_{\phi_j}$.

Therefore, in the second mode, entropy of the apparatus 1400 may be expressed as:

$$\epsilon_{MRO} = \epsilon_{\phi_0} + \epsilon_{\phi_j} \quad (5)$$

Conclusion: Total Entropy of Apparatus for Generating Random Number

When entropy in the first mode, entropy during the initial period of the second mode, and entropy after the initial period of the second mode is summed up, the apparatus 1400 according to the exemplary embodiment of the inventive concept has entropy expressed as:

$$\epsilon_\Sigma = \epsilon_{MS} + \epsilon_{MRO} = \Sigma \epsilon_{MS_i} + \epsilon_{\phi_0} + \epsilon_{\phi_j} \quad (6)$$

Therefore, the apparatus 1400 according to the technical spirit of the inventive concept has high entropy which is a sum of both entropy based on metastability signals generated by a plurality of random number generators in the first mode and entropy based on an oscillation signal generated by connection of the plurality of random number generators in the second mode, thereby generating a high-quality true random number.

FIG. 15 is a block diagram of an apparatus 1500 for generating a random number according to another exemplary embodiment of the inventive concept. The apparatus 1500 according to the current embodiment may be a modified example of the apparatus 1400 according to the embodiment shown in FIG. 14. Therefore, a repetitive description on the same components of the embodiments is omitted.

Referring to FIG. 15, as described above, second input terminals of the multiplexers MUX1, MUX2, and MUX3 may be connected to output terminals of the amplifiers 1425_1, 1425_2, and 1425_3 of a different random number generator. Thus, in the second mode, the apparatus 1500 operates as a ring oscillator and generates an oscillation signal through the multiplexer MUX1, the inverters INV 11, INV 12, through INV 1K of the random number generator 1430_1, the multiplexer MUX2, the inverters INV 21, INV 22, through INV 2K of the random number generator 1430_2, the multiplexer MUX3, and the inverters INV 31, INV 32, through INV 3K of the random number generator 1430_3.

That is, through these components, the oscillation signal may be continuously generated. However, it should be noted that inversion and amplification have to be performed an odd-number of times in a single cycle to continue generating the oscillation signal. Therefore, the total number of inverters INV 11, INV 12, INV 13, INV 21, INV 22, INV 23, INV 31, INV 32, and INV 33 of the random number generators 1430_1, 1430_2, and 1430_3 may be an odd number.

The output terminals of the amplifiers 1425_1, 1425_2, and 1425_3 have high-level voltages as amplification results, such that a signal input to the inverter INV 11, INV 21, or INV 31 of a different random number generator from the output terminal in the second mode has a high voltage level. Therefore, it is possible to prevent loss of entropy due to mismatch in threshold level between inverters (for example, the inverters INV 33 and INV 11, the inverters INV 13 and INV 21, and the inverters INV 23 and INV 31).

Figure 16:
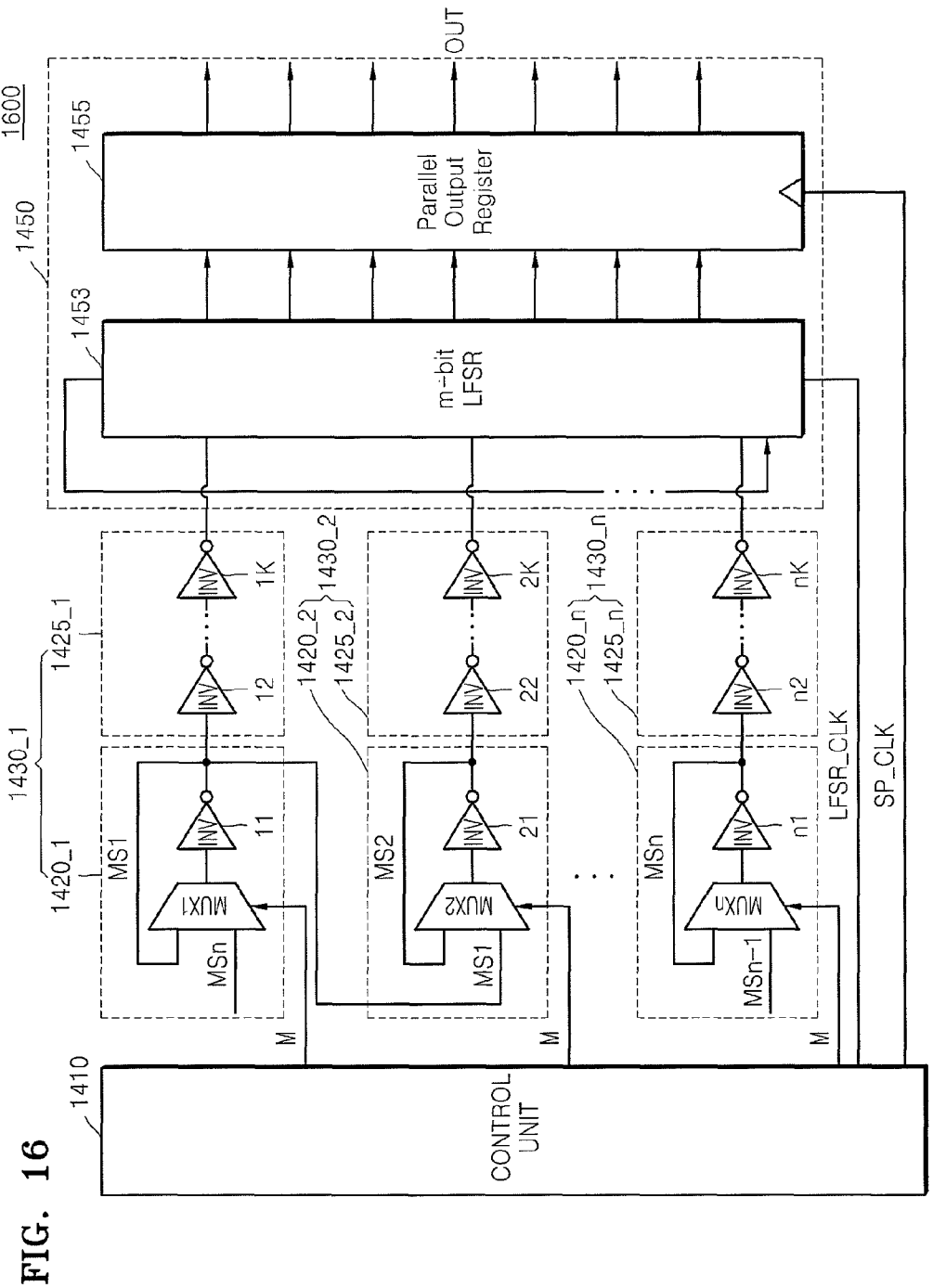
FIG. 16 is a block diagram of an apparatus for generating a random number according to another exemplary embodiment based on the technical spirit of the inventive concept.

FIG. 16 is a block diagram of an apparatus 1600 for generating a random number according to another exemplary embodiment of the inventive concept. The apparatus 1600 according to the current embodiment may be a modified example of the apparatus 1400 according to the embodiment shown in FIG. 14. Therefore, a repetitive description on the same components of the embodiments is omitted.

Referring to FIG. 16, the sampling unit 1450 may be implemented by a linear feedback shift register (LFSR) 1453 from which an additional increase in entropy may be expected.

When the LFSR 1453 is implemented as an m-bit LFSR, random numbers may be generated in parallel. In this case, outputs of the m-bit LFSR may be temporarily stored in a parallel output register 1455 and parallel random numbers may be output in response to a sampling clock SP_CLK. Generally, the sampling clock SP_CLK applied to a parallel output register 1455 and a clock LFSR_CLK applied to an m-bit LFSR 1453 do not have to be synchronized with each other.

Figure 17:
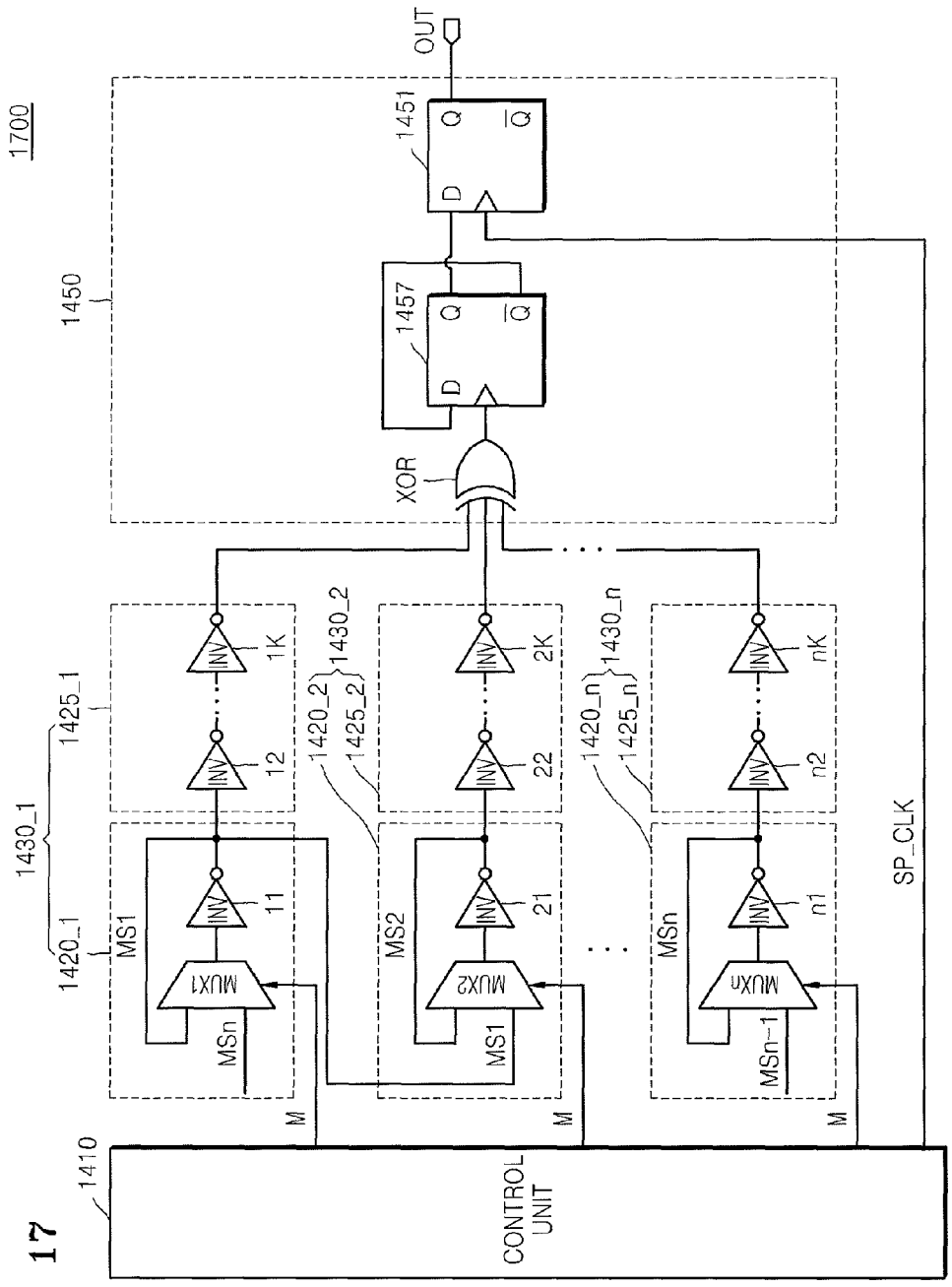
FIG. 17 is a block diagram of an apparatus for generating a random number according to another exemplary embodiment of the inventive concept.

FIG. 17 is a block diagram of an apparatus 1700 for generating a random number according to another exemplary embodiment of the inventive concept. The apparatus 1700 according to the current embodiment may be a modified example of the apparatus 1400 according to the embodiment shown in FIG. 14. Therefore, a repetitive description on the same components of the embodiments is omitted.

Referring to FIG. 17, the sampling unit 1450 may be connected with the random number generators 1430_1, 1430_2, through 1430_n to sample outputs of the random number generators 1430_1, 1430_2, through 1430_n. For example, the sampling unit 1450 may include an XOR gate XOR, a mode 2 counter 1457, and a flip-flop 1451.

The XOR gate XOR may perform an XOR operation on amplified signals of the amplifiers 1425_1, 1425_2, through 1425_n and output an XOR result, as described with reference to FIG. 14.

The mode 2 counter 1457 may count the number of rising edges (that is, the number of transitions from the low state to the high state) of an output signal of the XOR gate XOR. In other words, the mode 2 counter 1457 outputs 1 when the number of rising edges is an odd number and outputs 0 when the number of rising edges is an even number. However, the inventive concept is not limited thereto, and the mode 2 counter 1457 may count both the number of falling edges and the number of rising and falling edges. The mode 2 counter 1457 may be implemented by other types of counters to perform the counting function described above.

The flip-flop 1451 may sample and output the output signal of the mod 2 counter 1457 in response to the sampling clock SP_CLK applied from the control unit 1410. For example, the flip-flop 1451 is a D flip-flop and a cycle of the sampling clock SP_CLK provided from the control unit 1410 is 1 μs, the D flip-flop may store and output a state of the output signal of the mod 2 counter 1457, that is, the high state or the low state, every 1 μs.

Consequently, the apparatus 1700 according to the embodiment shown in FIG. 17 counts the number of rising edges at the XOR gate XOR during a cycle of the sampling clock SP_CLK applied from the control unit 1410 and generates a random number 0 or 1 according to whether the number of rising edges is an odd number or an even number.

Figure 18:
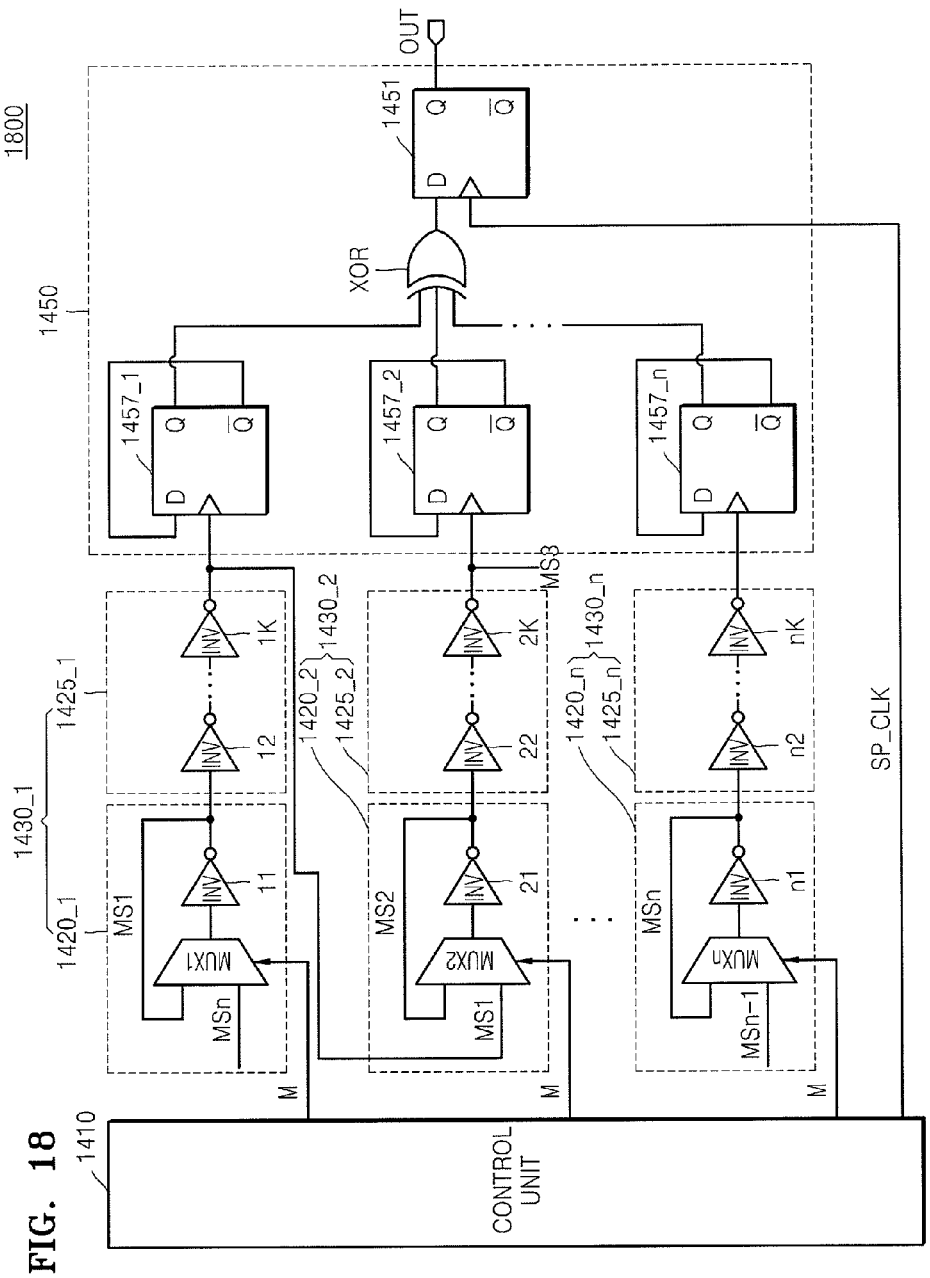
FIG. 18 is a block diagram of an apparatus for generating a random number according to another exemplary embodiment of the inventive concept.

FIG. 18 is a block diagram of an apparatus 1800 for generating a random number according to another exemplary embodiment based on the technical spirit of the inventive concept. The apparatus 1800 according to the current embodiment may be a modified example of the apparatus 1400 according to the embodiment shown in FIG. 14. Therefore, a repetitive description of the same components of the embodiments will be omitted.

Referring to FIG. 18, the second input terminals of the multiplexers MUX1, MUX2, through MUXn may be connected with the output terminals of metastability generation units (that is, the inverters INV 11, INV 21, through INV n1) of a different random number generator or the output terminals of the amplifiers 1425_1, 1425_2, through 1425_*n*. In particular, each of the amplifiers 1425_1, 1425_2, through 1425_*n* may include a plurality of amplification stages (e.g., inverters INV 12 through INV 1*k*, inverters INV 22 through INV 2*k*, and inverters INV n2 through INV nk) for amplifying and outputting input signals, and in this case, the plurality of amplification stages (in each of the amplifiers 1425_1, 1425_2, 1425_3) may be connected in series.

As in the embodiment shown in FIG. 14, the second input terminal of the multiplexer MUX1 of the random number generator 1430_1 may be connected with the output terminal of the metastability generation unit 1420_*n* (that is, the inverter INV n1). The second input terminal of the multiplexer MUX2 of the random number generator 1430_2 may be connected with the output terminal of the amplifier 1425_1 of the random number generator 1430_1, as in the embodiment shown in FIG. 15. Although not shown in FIG. 18, a second input terminal of a third multiplexer (not shown) of a third random number generator (not shown) may be connected with an output terminal of an amplification stage (for example, INV 22) among the plurality of amplification stages, that is, inverters INV 22 through INV 2*k* of the amplifier 1425_2.

The sampling unit 1450 may be connected with the random number generators 1430_1, 1430_2, through 1430_*n* to receive amplified signals from the amplifiers 1425_1, 1425_2, through 1425_*n* and sample and output the amplified signals according to the sampling clock SP_CLK. For example, the sampling unit 1450 may include mod 2 counters 1457_1, 1457_2, through 1457_*n*, the XOR gate XOR, and the flip-flop 1451.

The mod 2 counters 1457_1, 1457_2, through 1457_*n* may be connected with the random number generators 1430_1, 1430_2, through 1430_*n*, respectively, to count the number of rising edges of amplified signals output from the amplifiers 1425_1, 1425_2, through 1425_*n*. As mentioned above, the mod 2 counters 1457_1, 1457_2, through 1457_*n* may also count the number of falling edges or the number of rising and falling edges.

In the first mode, the mod 2 counters 1457_1, 1457_2, through 1457_*n* may output 1 when the number of rising edges of amplified metastability signals output from the amplifiers 1425_1, 1425_2, through 1425_*n* of the random number generators 1430_1, 1430_2, through 1430_*n* is an odd number, and may output 0 when the number of rising edges is an even number.

In the second mode, the mod 2 counters 1457_1, 1457_2, through 1457_*n* may output 1 when the number of rising edges of amplified oscillation signals output from the amplifiers 1425_1, 1425_2, through 1425_*n* of the random number generators 1430_1, 1430_2, through 1430_*n* is an odd number, and may output 0 when the number of rising edges is an even number.

The XOR gate XOR may perform an XOR operation on the output signals of the n mod 2 counters 1457_1, 1457_2, through 1457_*n* and output an XOR result. More specifically, the XOR gate XOR may output a high-state signal when the number of mod 2 counters which output a high-state signal is an even number; whereas when the number of mod 2 counters which output a high-state signal is an odd number, the XOR gate XOR may output a low-state signal. Through the XOR operation, entropy of random number generators is summed up, thereby implementing an apparatus for generating a random number having high entropy expressed by Equation (1).

The flip-flop 1451 may sample and output the output signal of the XOR gate XOR. For example, when the flip-flop 1451 is a D flip-flop and a cycle of the sampling clock SP_CLK provided from the control unit 1410 is 1 µs, the D flip-flop may store and output a state of the output signal of the XOR gate XOR, that is, the high state or the low state, every 1 µs.

Consequently, the apparatus 1800 according to the embodiment shown in FIG. 18 counts the number of rising edges (of the metastability signal or the oscillation signal) at each of the random number generators 1430_1, 1430_2, through 1430_*n* during a cycle of the sampling clock SP_CLK applied from the control unit 1410 through the mod 2 counters 1457_1, 1457_2, through 1457_*n*, and performs an XOR operation on the outputs of the mod 2 counters 1457_1, 1457_2, through 1457_*n*, thus generating a random number 0 or 1.

Figure 19:
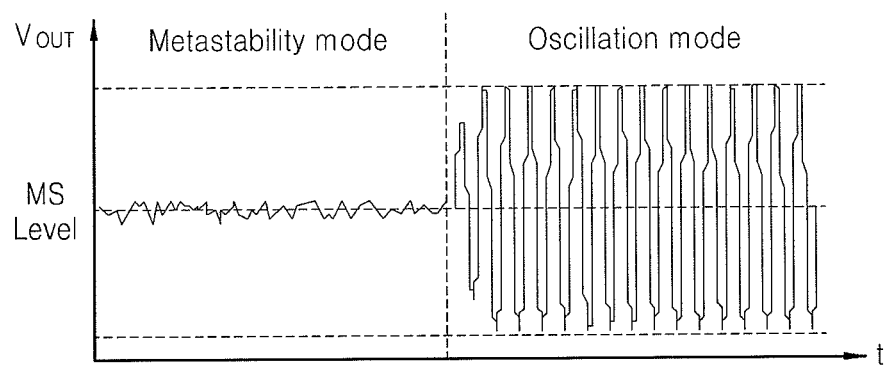
FIGS. 19 and 20 are graphs of an output waveform generated by the apparatus for generating a random number of FIG. 18.
Figure 20:
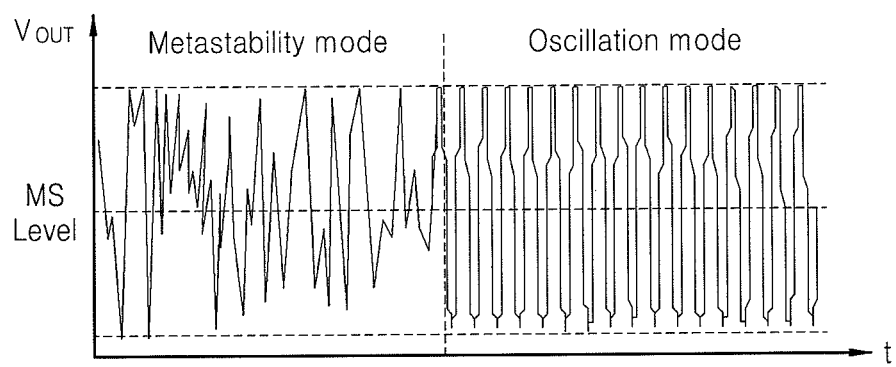

FIGS. 19 and 20 are graphs of an output waveform generated by the apparatus 1800 shown in FIG. 18.

Referring to FIGS. 18 and 19, a signal output from the output terminal of the metastability generation unit 1420_*n* of the random number generator 1430_*n* is shown. In the first mode (metastability mode), a metastability signal is output from the output terminal due to thermal noise. On the other hand, in the second mode (oscillation mode), an oscillation signal generated by inverting and amplifying the metastability signal is output from the output terminal.

Referring to FIG. 20, a signal output from output terminal of the amplifier 1425_*n* of the random number generator 1430_*n* is shown. In the first mode (metastability mode), an amplified signal of the metastability signal generated due to thermal noise is output from the output terminal. That is, in the second mode (oscillation mode), an oscillation signal generated by inverting and amplifying the metastability signal is output from the output terminal.

Figure 21:
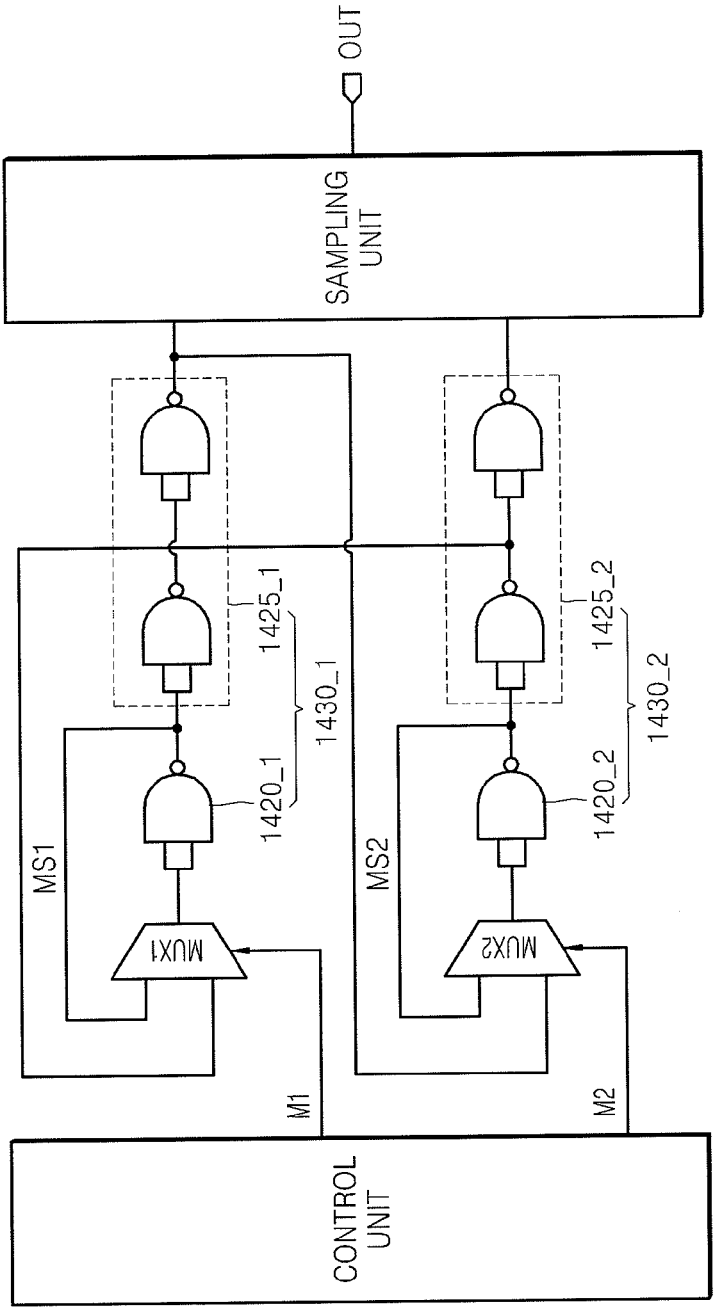
FIGS. 21 and 22 are block diagrams of apparatuses for generating a random number according to other exemplary embodiments of the inventive concept.
Figure 22:
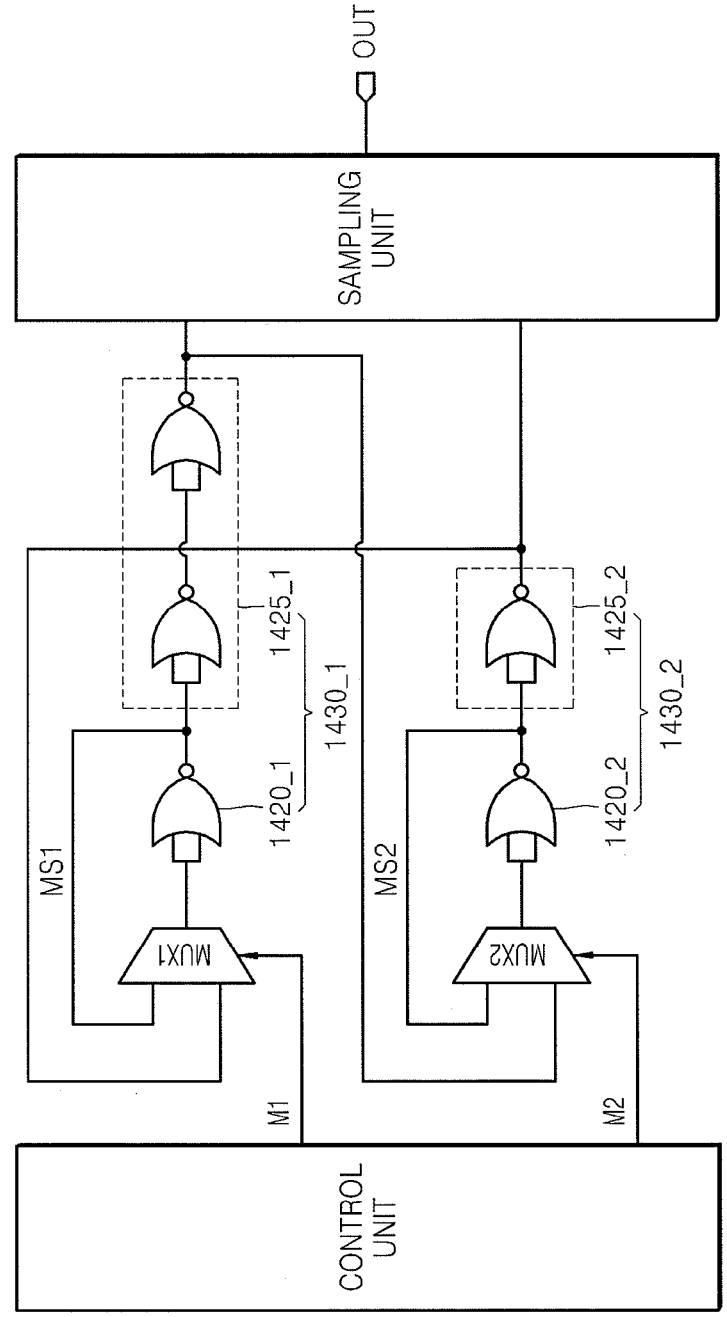

FIGS. 21 and 22 are block diagrams of apparatuses 2100 and 2200 for generating a random number according to other exemplary embodiments of the inventive concept. The apparatuses 2100 and 2200 according to the present embodiments may be modified examples of the apparatus 1400 according to the embodiment shown in FIG. 14. Therefore, a repetitive description on the same components of the embodiments is omitted.

Referring to FIGS. 21 and 22, inverters may be implemented by NAND gates or NOR gates. Operating principles in case of using inverters, NAND gates, and NOR gates have already been described with reference to FIGS. 2A and 2B, and thus, will not be described in detail. As shown in FIG. 22, the number of amplification stages of the amplifier 1425_1 of the random number generator 1430_1 and the number of amplification stages of the amplifier 1425_2 of the random number generator 1430_2 may be different from each other.

An apparatus for generating a random number according to the exemplary embodiments of the inventive concept has high entropy by summing not only entropy based on a metastability signal generated by a plurality of random number generators in a first mode but also entropy based on an oscillation signal generated by the connected plurality of random number generators in the second mode, thus generating a high-quality true random number.

It will be understood that the shape of each portion in the attached drawings is illustrative for clear understanding of the inventive concept. Therefore, it should be noted that the illustrated shape may be changed variously. Throughout the drawings, like reference numerals refer to like elements.

While the inventive concept has been particularly shown and described with reference to exemplary embodiments thereof, it will be understood that various substitutions, modifications, and changes in form and details may be made therein without departing from the spirit and scope of the following claims.

What is claimed is:

1. An apparatus for generating a random number, which comprises a plurality of random number generators,
wherein each of the plurality of random number generators generates a metastability signal and generates a random number by using the generated metastability signal in a first mode, and
wherein the plurality of random number generators are connected to each other to operate as a ring oscillator in a second mode,
wherein each of the plurality of random number generators comprises:
a metastability generation unit generating and outputting the metastability signal; and
an amplifier amplifying an output signal of the metastability generation unit.

2. The apparatus of claim 1, wherein the metastability generation unit generates and outputs the metastability signal in the first mode, and receives and amplifies an output signal of a different random number generator in the second mode.

3. The apparatus of claim 1, wherein the metastability generation unit comprises an inverter inverting and outputting a received signal,
wherein an input terminal of the inverter is connected with an output terminal of the inverter in the first mode, and
wherein the input terminal of the inverter is connected with a different random number generator in the second mode.

4. The apparatus of claim 1, wherein the metastability generation unit comprises a multiplexer selectively outputting an input signal in response to a mode signal,
wherein a first input terminal of the multiplexer is connected with an output terminal of the metastability generation unit, and
wherein a second input terminal of the multiplexer is connected with a different random number generator.

5. The apparatus of claim 4, wherein the second input terminal of the multiplexer is connected with an output terminal of a metastability generation unit of the different random number generator.

6. The apparatus of claim 4, wherein the second input terminal of the multiplexer is connected with an output terminal of an amplifier of the different random number generator.

7. The apparatus of claim 6, wherein the amplifier comprises a plurality of amplification stages amplifying and outputting an input signal, and
wherein the plurality of amplification stages are connected in series.

8. The apparatus of claim 7, wherein the second input terminal of the multiplexer is connected with an output terminal of one of the plurality of amplification stages.

9. An apparatus for generating a random number, which comprises a plurality of random number generators,
wherein each of the plurality of random number generators generates a metastability signal and generates a random number by using the generated metastability signal in a first mode, and
wherein the plurality of random number generators are connected to each other to operate as a ring oscillator in a second mode, and
a sampling unit receiving an amplified signal from an amplifier of each of the plurality of random number generators and sampling and outputting the amplified signal according to a sampling clock.

10. The apparatus of claim 9, wherein the sampling unit comprises:
an XOR gate performing an XOR operation on the amplified signal and outputting an XOR result; and
a flip-flop sampling and outputting an output signal of the XOR gate.

11. The apparatus of claim 9, wherein the sampling unit comprises a plurality of counters, each of the plurality of counters counting the number of rising edges, the number falling edges, or the number of rising and falling edges of the amplified signal of each of the plurality of random number generators.

12. The apparatus of claim 11, wherein the sampling unit comprises:
an XOR gate performing an XOR operation on output signals of the plurality of counters and outputting an XOR result; and
a flip-flop sampling and outputting an output signal of the XOR gate.

* * * * *